(12) United States Patent
Murakami et al.

(10) Patent No.: US 6,317,720 B1
(45) Date of Patent: Nov. 13, 2001

(54) SHARED VEHICLE DEPLOYMENT AND REALLOCATION USING PREDICTED AND CURRENT DEMAND LOCATION AND TRANSIT DATA

(75) Inventors: Hiroshi Murakami; Shunji Yano; Yuji Uehara; Kazuhiro Nakamura, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/333,962

(22) Filed: Jun. 16, 1999

Related U.S. Application Data

(60) Provisional application No. 60/089,506, filed on Jun. 16, 1998, and provisional application No. 60/092,964, filed on Jul. 15, 1998.

(30) Foreign Application Priority Data

| Jul. 10, 1998 | (JP) | 10-211942 |
|---|---|---|
| Jul. 10, 1998 | (JP) | 10-211943 |
| Jul. 10, 1998 | (JP) | 10-211944 |

(51) Int. Cl.$^7$ .................................. G06F 17/60
(52) U.S. Cl. ................... 705/10; 705/5; 705/13
(58) Field of Search .................. 705/5, 10, 13; 701/117

(56) References Cited

U.S. PATENT DOCUMENTS

| 4,360,875 | * | 11/1982 | Behnke .............................. 455/456 |
| 5,168,451 | * | 12/1992 | Bolger ................................ 701/117 |
| 5,289,369 | * | 2/1994 | Hirshberg ........................... 705/13 |
| 5,726,885 | * | 3/1998 | Klein et al. ......................... 455/456 |
| 5,812,070 | * | 9/1998 | Tagami et al. ...................... 340/932 |
| 5,945,919 | * | 8/1999 | Trask .................................. 340/825 |

FOREIGN PATENT DOCUMENTS

| 9-15309 8A | 6/1997 | (JP) . |
| 09152914-A | * 6/1997 | (JP) .......................... B23Q/41/02 |

OTHER PUBLICATIONS

Barth et al. Simulation model performance analysis of a multiple station shared vehicle system. Transportation Research Part C Emerging Technologies, Aug. 1999.*
Parent. A Dual Mode Personal Rapid Transit System. Third International Conference on ITS Australia, Mar. 1997.*

\* cited by examiner

*Primary Examiner*—Tariq R. Hafiz
*Assistant Examiner*—D Robertson
(74) *Attorney, Agent, or Firm*—Birch, Stewart, Kolasch & Birch, LLP

(57) ABSTRACT

A vehicle allocation system oversees the operation of a plurality of auto-piloted vehicles, used to transport passengers between major ports such as airports, train stations, shopping malls, etc. The vehicle allocation system establishes a search time interval and predicts passenger demands and the status of the monitored vehicles within the search time interval. A predetermined number of vehicles are assigned to each of the ports in an area. Each port includes a parking lot or queue to accommodate waiting vehicles and a terminal which notifies a host computer of the number of currently available vehicles, passenger demands for vehicles, vehicle destination information, arrival information and so forth. The host computer has a memory storing predicted demand data based upon past demand history. The host computer calculates any excess or deficiency of vehicles in the ports on the basis of the predicted demand data and the information obtained from the terminals within the search time interval. On the basis of the result of such calculation, vehicles are reallocated from ports having an excess of vehicles to ports lacking sufficient vehicles.

16 Claims, 20 Drawing Sheets

FIG. 7
| PORT | P1 | P2 | P3 | P4 | P5 |
|------|-----|-----|-----|-----|-----|
| P1 | | 5 MIN | 15 MIN | 20 MIN | 30 MIN |
| P2 | 5 MIN | | 7 MIN | 15 MIN | 20 MIN |
| P3 | 15 MIN | 7 MIN | | 9 MIN | 20 MIN |
| P4 | 20 MIN | 15 MIN | 9 MIN | | 10 MIN |
| P5 | 30 MIN | 20 MIN | 20 MIN | 10 MIN | |
FIG. 8
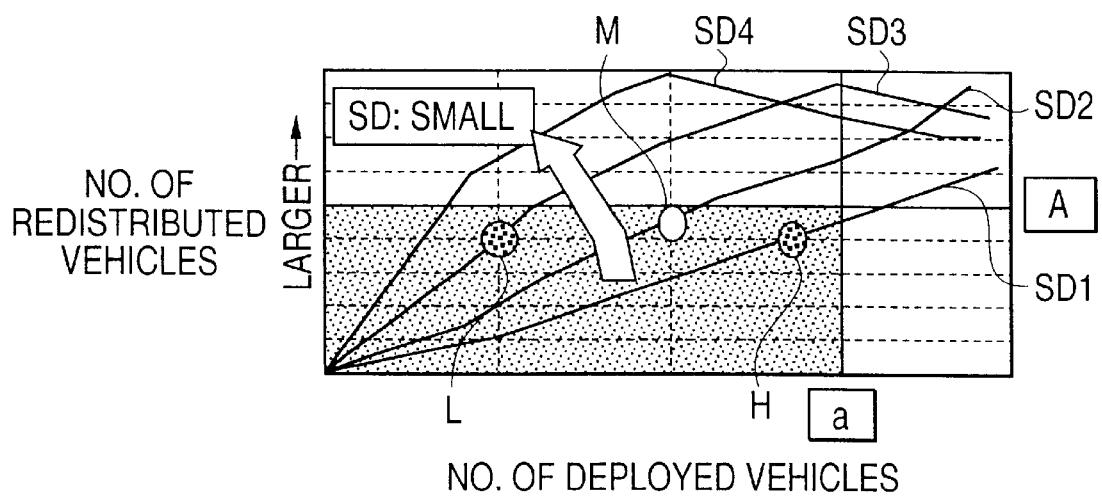
FIG. 9
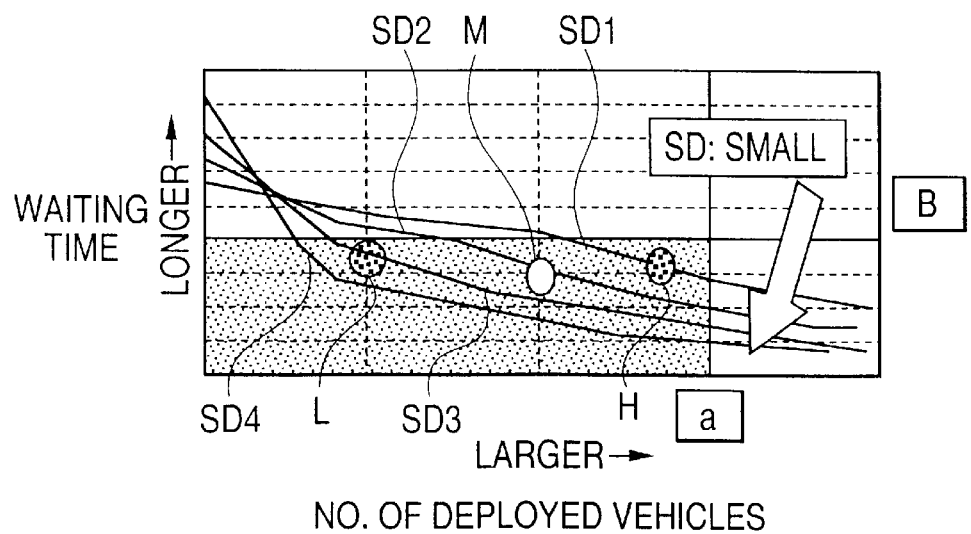

FIG. 10(a)

| PORT | P1 | P2 | P3 | P4 | P5 |
|------|------|-------|------|------|-------|
| P1   |      | 5.07  | 6.75 | 8.61 | 10.50 |
| P2   | 5.07 |       | 5.71 | 7.65 | 9.49  |
| P3   | 6.75 | 5.71  |      | 2.70 | 4.51  |
| P4   | 7.14 | 7.14  | 2.16 |      | 5.07  |
| P5   | 11.62| 10.56 | 5.48 | 3.47 |       |

FIG. 10(b)

| PORT | P1   | P2   | P3   | P4   | P5   |
|------|------|------|------|------|------|
| P1   |      | 10.2 | 16.2 | 18.6 | 25.2 |
| P2   | 10.2 |      | 13.2 | 15.6 | 22.2 |
| P3   | 16.2 | 13.2 |      | 3.0  | 9.6  |
| P4   | 18.0 | 15.0 | 2.4  |      | 10.8 |
| P5   | 25.8 | 22.8 | 10.2 | 7.8  |      |

FIG. 10(c)

| PORT | P1 | P2 | P3 | P4 | P5 |
|------|----|----|----|----|----|
| P1   |    | 15 | 5  | 5  | 5  |
| P2   |    |    | 15 | 5  | 5  |
| P3   |    |    |    | 15 | 15 |
| P4   |    |    |    |    | 15 |
| P5   |    |    |    |    |    |

%

| JUDGING TIME | TA | TB | TC | TD | TE |
|---|---|---|---|---|---|
| EXISTING DEMAND COUNT | 2 | 4 | 5 | 0 | 1 |
| EXISTING VEHICLE COUNT | 1 | 1 | 9 | 6 | 3 |
| PREDICTED DEMANDS | 1 | 6 | 6 | 3 | 1 |
| REDISTRIBUTED VEHICLE COUNT | +2 | +9 | +2 | -3 | -1 |

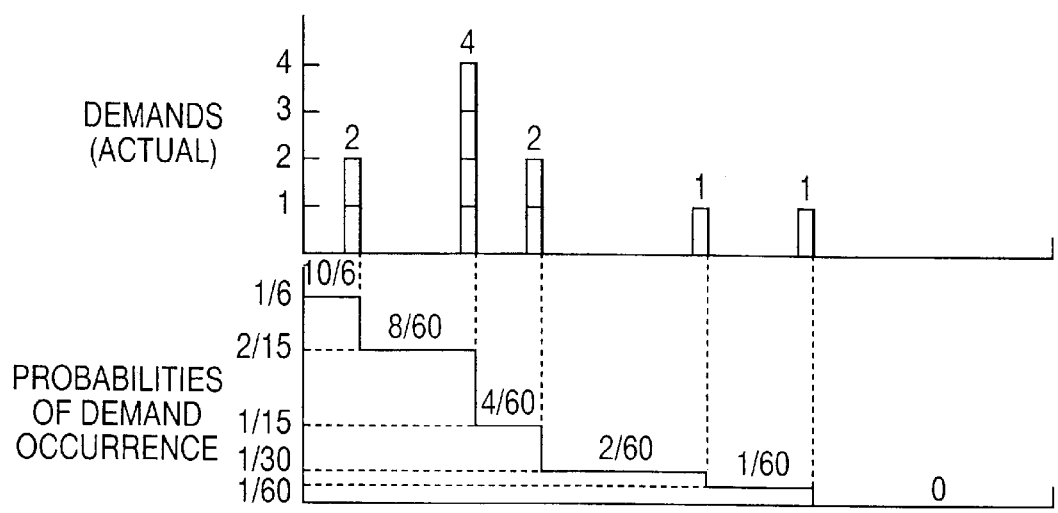

SHARED VEHICLE DEPLOYMENT AND REALLOCATION USING PREDICTED AND CURRENT DEMAND LOCATION AND TRANSIT DATA

This application claims benefit of Provisional Nos. 60/089,506 filed Jun. 16, 1998 and 60/092,964 filed Jul. 15, 1998.

BACKGROUND OF THE INVENTION

1. Field of the Invention

The present invention relates generally to a vehicle distribution system and, more particularly, to a vehicle distribution system for providing a stable supply or distribution of vehicles to a plurality of ports within an area so as to keep up with ride demands at each of the ports.

2. Description of the Relevant Art

Where vehicles need to be distributed among a plurality of ports within an area in response to ride demands generated at each of the ports, some ports may lack vehicles to meet their ride demands while others may have excess vehicles. In such a case, a vehicle distribution system may be devised to reallocate or redistribute surplus vehicles between ports to replenish shortages of vehicles at other ports.

According to the background art, one vehicle distribution system is designed to deal with vehicle shortages on a posterior basis. In other words, vehicles are reallocated when a shortage occurs and not in anticipation of a predicted shortage. It takes time to move surplus vehicles from one port to another. Therefore, if a new ride demand occurs while vehicle redistribution is under way, or if some vehicles left ports on their way to other ports before a redistribution process is initiated, a surplus or shortage of vehicles may occur again at any port upon completion of the redistribution. Such occurrences can cause passengers to be left wait on vehicles for extended periods of time, such that a preferred minimum waiting time for passengers cannot be observed in the face of varying ride demands.

One solution to the above deficiency may be for vehicles to be redistributed on the basis of predicted ride demand data. Illustratively, a system may be devised to distribute vehicles according to predicted ride demand data based on the number of existing vehicles at each of the ports, on the ride demands currently generated at the port in question, and on past statistical ride demand data regarding the port.

One example of that system is a vehicle demand predicting system disclosed in Laid-Open Japanese Patent Application No. Hei 9-153098. This vehicle demand predicting system utilizes the statistical data as raw data. This means that if the raw data differ from actual ride demands, the system is significantly affected by such variances. The result can be a vehicle distribution system of poor accuracy, with a large number of vehicles redistributed unproductively (as will be discussed in detail with reference to FIGS. 14 and 15). If the system redistributes vehicles while predicting ride demands using statistical data, the redistribution process should preferably be carried out with a minimum of wastefully redistributed vehicles, even if actual ride demands deviate from the statistical data.

SUMMARY OF THE INVENTION

It is therefore an object of the present invention to provide a vehicle distribution system capable of minimizing wastefully redistributed vehicles in the face of actual ride demand fluctuations.

These and other objects of the invention are fulfilled by providing a method of operating a vehicle allocation system for allocating a first number of vehicles amongst a second number of vehicle ports where passengers demand the services of one or more vehicles, said method comprising the steps of: acquiring past vehicle demand data based upon past passenger transportation activity; forming predictive vehicle demand data, based upon the past vehicle demand data; storing the predictive vehicle demand data; detecting a number of available vehicles at each of the ports; sensing current vehicle demand data representing passengers actually seeking transportation at each of the ports; reading vehicle destination and arrival data of vehicles starting or in transit to one of the ports; predicting the number of arriving vehicles at each of the ports based upon the vehicle destination and arrival data; determining whether a given port has a deficiency or an excess of vehicles by analyzing the current vehicle demand data, the predictive vehicle demand data, the number of available vehicles, and the number of arriving vehicles, for a predetermined period of time; and reallocating vehicles from a port determined to have an excess of vehicles to a port determined to have a deficiency of vehicles.

These and other objects of the invention are also fulfilled by providing a method of operating a vehicle redistribution system for predicting ride demands based on ride demands generated at a plurality of ports in an area, as well as, based upon statistical ride demand data the plurality of ports in order to redistribute vehicles from a port having surplus vehicles to a port lacking vehicles, said method comprising the steps of: predicting total ride demand data on a daily basis from the statistical ride demand data; selecting a number of total vehicles to be deployed within the area by computing the number of total vehicles using a formula: total vehicles=number of all ports in the area times number of predicted ride demands per average travel time between ports, wherein the number of predicted ride demands per average travel time between ports is tabulated on daily basis.

Furthermore, these and other objects of the invention are fulfilled by providing a vehicle distribution system for distributing vehicles among a plurality of ports within an area in response to ride demands generated at each of said ports, said vehicle distribution system comprising: predicted ride demand data storing means for storing predicted ride demand data established on the basis of statistical ride demand data regarding all ports; vehicle count detecting means for detecting an existing vehicle count at each of said ports; demand detecting means for detecting ride demand information including a current ride demand count and destination information regarding each of said ports; arriving vehicle predicting means for predicting arrivals of vehicles at each port from other ports as a predicted arriving vehicle count based on said destination information; surplus and shortage computing means for computing either a surplus or a shortage of vehicles at each of said ports by comparing, within a range of search represented by a predetermined period of time at each port, said current ride demand count and said predicted ride demand data, with said existing vehicle count and said predicted arriving vehicle count; and vehicle redistributing means for redistributing vehicles from a port having surplus vehicles to a port lacking vehicles on the basis of results of the computation indicating either said surplus or said shortage of vehicles.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein:

FIG. 7 is a table illustrating an example of travel time requirements for vehicles to move between ports;

FIG. 8 is a graph illustrating a relationship between the number of assigned vehicles and the number of reallocation vehicles;

FIG. 9 is a graph illustrating a relationship between the number of assigned vehicles and the average waiting time;

FIGS. 10($a$) and 10($b$) are tables illustrating vehicle running times between ports;

FIG. 10($c$) is a table illustrating frequencies of trips between specific ports in percentages;

FIG. 16 is a graphic representation showing how probabilities of demand occurrence typically vary with respect to statistical data;

FIG. 17 is a table indicating how vehicles are typically redistributed in accordance with the probability of demand occurrence;

DETAILED DESCRIPTION OF THE INVENTION

Preferred embodiments of this invention will now be described in detail with reference to the accompanying drawings.

Figure 1:
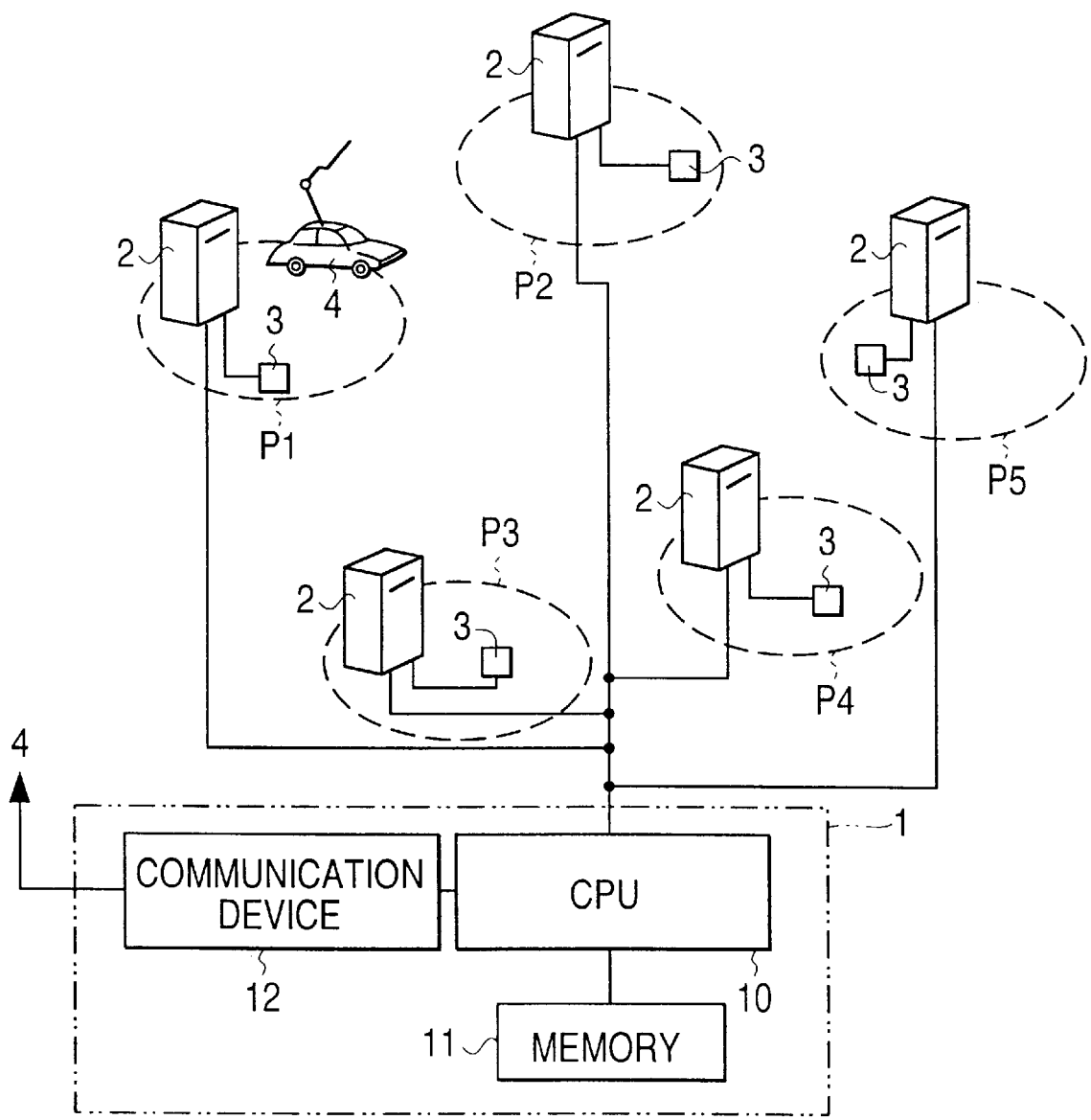
FIG. 1 is a system diagram illustrating a vehicle allocation system, in accordance the present invention.

FIG. 1 is a schematic diagram illustrating a typical vehicle distribution system embodying the invention. In this example, five ports are assumed to exist within an area. Ports PI through P5 (generically called the port P hereunder where appropriate) represent parking spaces at such places as a golf course, an airport, a hotel, etc. A plurality of vehicles 4 is deployed within the area. An optimum number of vehicles to be operated in the area will be discussed later. Each port P has a terminal 2. Each terminal 2 is furnished with a sensor 3 that detects the comings and goings of the vehicles 4.

The sensor 3 is capable of identifying a vehicle 4 by detecting its vehicle number. The vehicle number to be detected may be that of a number plate attached to the front and/or rear of each vehicle, or some suitable number provided on the side or top of each vehicle for detection. The vehicle number is not limited to numerals. It may be formed by identification information using a bar code, characters, marks and/or other symbols. The sensor 3 may be an optical, electrical or magnetic sensor for optically or electronically reading such vehicle numbers from vehicles.

Each terminal 2 has an identification unit (not shown) for identifying vehicle users. The identification unit checks an ID number, or other data, entered by a vehicle user to see if the user is a registered contractor, e.g. a vehicle user known to the system for billing purposes. The ID number or like data should be stored preferably on an IC card. The identification unit reads data from the IC card submitted by a user prior to vehicle use. When the use of the vehicle is terminated, the user again submits his or her IC card to the identification unit, which upon reading the IC card, verifies the end of vehicle use. The terminal 2 also comprises an input unit (not shown) through which users enter desired destinations. The input unit may be formed by a set of switches corresponding to the port names.

Each vehicle 4 may illustratively be an electric vehicle that is auto-piloted. When a user is allowed to use a vehicle, the doors of the vehicle are unlocked and the vehicle is made ready to be started. Instead of having its doors automatically unlocked, the vehicle may be unlocked manually by a user utilizing his or her IC card. In any case, it is preferred that the identification information (ID number, etc.) identifying each potential vehicle user carrying an IC card be recognized by the terminal 2 of the port P before the user rides a vehicle.

The terminals 2 are connected to a host computer 1 (called the host hereunder) through communication lines. Data are exchanged between the terminals 2 and the host 1. The terminal 2 of a port P, at which a vehicle user wishes to ride a vehicle, transmits to the host 1 the vehicle numbers of the existing vehicles and the existing vehicle count at the port P in question, as well as the ID number of the contractor and the ride demand. A demand occurs when a user enters his or her ID number. Each demand includes destination information. Given such an ID number, the host 1 references stored personal information on contractors to decide whether to allow the use of a vehicle for the user in question.

Following a decision in favor of the vehicle use, the host 1 allows the terminal 2 to rent a vehicle and to designate a specific vehicle to be rented. The permission to rent a vehicle and the designation of the vehicle to be rented permit the user to actually ride the vehicle. The rent permission and the vehicle designation give rise to what is called a "starting trip."

The terminal 2 of a port P at which a vehicle user riding a vehicle has arrived transmits to the host 1 the vehicle numbers of currently available vehicles and the existing vehicle count at the port P, the contractor ID number of the user which arrived, recognized arrival information (called an arriving trip), and travel data about the contractor. An arriving trip is output when the sensor 3 detects the arrival at the port P of the vehicle 4 corresponding to the starting trip.

The host 1 has computing means (CPU) 10 and a storage device (memory) 11. The CPU 10, in conjunction with the memory 11, performs computations to supply the terminal 2 with permission to rent vehicles and designation of vehicles to be rented on the basis of information entered through the terminal 2. The host 1 also includes a communication device 12 for giving instructions to each vehicle 4.

The memory 11 stores predicted ride demand data (called starting trips hereunder) about each port P as part of statistical ride demand data regarding all ports. Also stored in the memory 11 are contractor information and contractor travel data. Predicted starting trips represent predicted daily demands based on past demand results. Contractor information denotes personal information such as contractor names associated with ID numbers. Contractor travel data are made up of contractors's ride distances and ride times used as accounting information to be used when the contractors are later billed.

Figure 2:
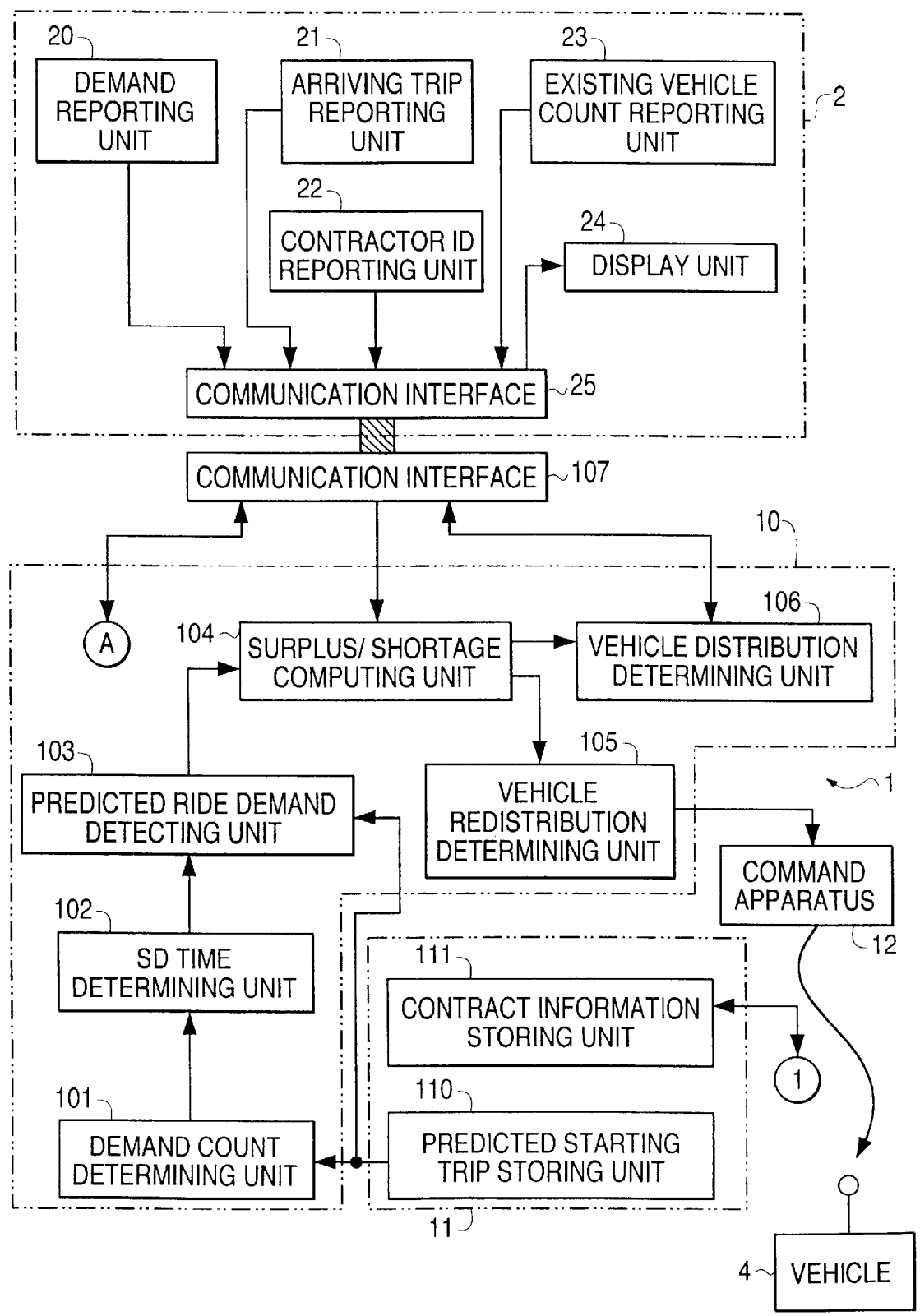
FIG. 2 is a block diagram illustrating principal functions of a terminal at each port and a host computer.

FIG. 2 is a block diagram showing key functions of a terminal 2 and the host 1. The terminal 2 includes a demand reporting unit 20, an arriving trip reporting unit 21, a contractor ID reporting unit 22 and an existing vehicle count reporting unit 23 for reporting respectively demands, arriving trips, contractor IDs and an existing vehicle count to the host. The demand reporting-unit 20 reports to the host 1 the occurrence of a demand whenever an ID number entered by a user is recognized. The arriving trip reporting unit 21 notifies the host 1 of arrivals of vehicles detected by the sensor 3. The contractor ID reporting unit 22 informs the host 1 of ID numbers read from IC cards or other medium. The existing vehicle count reporting unit 23 reports the current number of vehicles counted on the basis of the vehicle numbers, as well as, comings and goings of vehicles detected by the sensor 3.

The terminal 2 also has a display unit 24 that instructs or guides users to ride vehicles. In giving instructions or guidance to users, the display unit 24 relies on permission to rent vehicles or other suitable directives from the host 1. The instructions or guidance may be given as either visual or audio information. The terminal 2 comprises a communication interface 25 for exchanging data with the host 1. If a vehicle is currently available at the port P, and if the display unit 24 is capable of issuing an available vehicle instruction immediately after the input of an ID code, the display unit 24 may indicate the applicable vehicle number. If no vehicle is currently available at the port P, the display unit 24 may indicate a predicted waiting time.

The memory 11 of the host 1 has a predicted starting trip storing unit 110 and a contractor information storing unit 111. The predicted starting trip storing unit 110 accumulates daily demand results at each port in the form of time series data, and supplies the CPU 10 with the data denoting predicted starting trips. Presented as predicted starting trips, the past demand results may preferably be stored in accordance with the weather patterns, the time zones of the day, the days of the week, and other suitable criteria. This will allow the CPU 10 to get data on predicted starting trips in a specific time zone on a specific day of the week under a specific weather pattern. The contractor information storing unit 111 stores contractor information including the contractors's travel data. The contractor information is stored beforehand, and the contractors's travel data are entered from the terminals 2.

The CPU 10 is connected via a communication interface 107 to the communication interfaces 25 of the terminals 2. A demand count determining unit 101 of the CPU 10 determines a predicted number of vehicles demanded per hour on the basis of the predicted starting trips held in the memory 11. Depending on whether the predicted number of demanded vehicles exceeds a reference count, a search depth (SD) time determining unit 102 determines a search range, i.e., a search depth (SD) time which spans predetermined hours (or minutes) starting from the present time and in which to search for predicted starting trips. An algorithm for determining the SD time will be described later.

A predicted ride demand detecting unit 103 reads from the predicted starting trip storing unit 110 predicted starting trips within the SD time determined by the search depth time determining unit 102, and outputs what is read to a surplus/shortage computing unit 104. The surplus/shortage computing unit 104 computes a surplus or a shortage of vehicles based on the demands and existing vehicle count sent from the terminal 2 at each port P, as well as on the above-mentioned predicted starting trips. The computation of the vehicle surplus or shortage takes into account those arriving trips at destination ports which are predicted by the destination information included in the demands.

On the basis of the surplus or shortage of vehicles 4 at each port P, a vehicle redistribution determining unit 105 outputs instructions for moving excess vehicles 4 from one port P to another, i.e., for redistributing vehicles 4. Vehicle redistribution instructions are reported to the vehicles 4 via the communication device 12. Each vehicle 4 has a communication device and an automatic traveling unit allowing the vehicle to respond to redistribution instructions. The automatic traveling unit may be a position detecting system utilizing map data and GPS (global positioning system) data, or a known system relying on traffic signals and an obstruction monitoring and avoidance scheme.

If there is any available vehicle, a vehicle distribution determining unit 106 immediately notifies the applicable terminal 2 of permission to rent and designation of the vehicle to be rented. If a vehicle is lacking, the vehicle distribution determining unit 106 computes a waiting time based on a predicted arriving time of a redistributed vehicle designated by the vehicle redistribution determining unit 105. The terminal 2 is notified of the waiting time which is presented to the vehicle user waiting for a vehicle.

Figure 3:
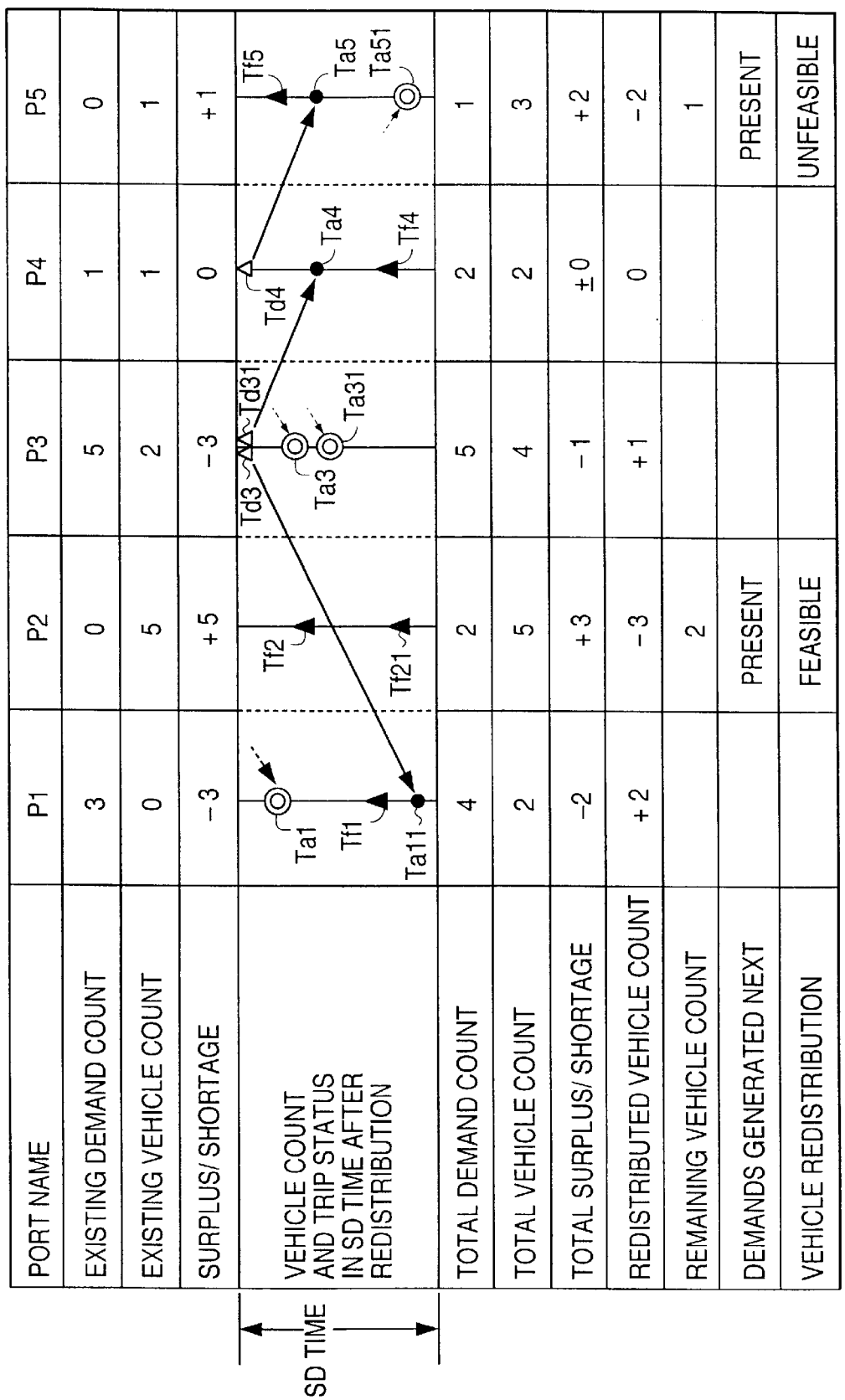
FIG. 3 is a table illustrating passenger demands and numbers of vehicles in all ports before any reallocation of the vehicles.

How vehicles are distributed will now be illustratively described. If vehicles were distributed solely on the basis of the existing vehicle count and current demands at each port P, efficient distribution of vehicles would be impossible because of fluctuating demands and constant movements of vehicles resulting in an additional surplus or shortage of vehicles. This bottleneck is circumvented by redistributing vehicles while considering demands and arriving trips within a predetermined SD time. FIG. 3 is a schematic diagram showing how the number of vehicles varies at each port P in keeping with the starting and arriving trips at the ports. This diagram takes into account those trips that are predicted to occur in the current SD time, but does not consider vehicles to be redistributed.

In FIG. 3, the port P1 has a demand count of 3 and an existing vehicle count of 0. That is, the port P1 lacks three vehicles at present. The port P1 is subject to two arriving trips: an arriving trip Ta1 stemming from a starting trip that occurred earlier at another port, and an arriving trip Ta11 resulting from a starting trip Td3 that occurred at the port P3 at the start of the current SD time. Furthermore, a starting trip Tf1 is predicted to occur. This brings the total demand count to 4. Since two vehicles are available in the current SD time against the demand count of 4, two vehicles are lacking at the port P1.

The port P2 has a demand count of 0 and an existing vehicle count of 5. That is, the port P2 has five surplus vehicles. With starting trips Tf2 and Tf21 predicted to occur at the port P2, the total demand count is brought to 2. Because five vehicles are available in the current SD time against the demand count of 2 at the port P2, three vehicles are in surplus there.

The port P3 has a demand count of 5 and an existing vehicle count of 2. This means that the part P3 currently lacks three vehicles. With two vehicles currently available, the port P3 immediately meets two demands causing starting trips Td3 and Td31 to occur. The port P3 is subject to arriving trips Ta3 and Ta31 stemming from starting trips that occurred at other ports in a previous SD time. With no predicted starting trip, the total demand count remains at 5. Because four vehicles are available in the current SD time against the demand count of 5, the port P3 lacks one vehicle.

The port P4 has a demand count of 1 and an existing vehicle count of 1 and thus has no surplus or shortage of vehicles at present Because it has one vehicle currently available, the port P4 immediately meets the existing demand, causing a starting trip Td4 to occur. With a starting trip Tf4 predicted to occur at the port P4, its total demand count is brought to 2. Furthermore, an arriving trip Ta4 is expected to occur due to a starting trip originated at the port P3. That is, two vehicles are available in the current SD time against the demand count of 2, so that there is no surplus or shortage of vehicles at the port P4.

The port P5 has a demand count of 0 and an existing vehicle count of 1 and thus has one vehicle currently in surplus. The port P5 is subject to two arriving trips: an arriving trip Ta5 stemming from the starting trip Td4 originated at the port P4, and an arriving trip Ta51 derived from a starting trip originated at another port in a previous SD time. With a starting trip Tf5 predicted to occur at the port, its total demand count amounts to 1. When the demand count is 1 is compared against the three vehicles available in the current SD time, the port P5 has two surplus vehicles.

Vehicles are redistributed on the assumption that vehicle and demand counts vary in the SD time. Below is a description of a multistage algorithm for vehicle redistribution. In a first stage of the algorithm, the ports with vehicles that may be redistributed within the SD time and the number of these available vehicles are detected. In the above example, the ports P2 and P5 have surplus vehicles that may be redistributed. In a second stage, the remaining number of vehicles following the redistribution of the surplus vehicles is obtained. In a third stage, a check is made to see if the remaining vehicles are enough to met the demands that may occur next.

Illustratively, a demand cannot be met immediately if it occurs at a given port P as a result of an arriving trip after all vehicles have been redistributed and before an available vehicle count at the port in question is replenished. In such a case, vehicle redistribution is deemed feasible if the remaining vehicle count is judged enough to cover the newly generated demand.

In the example above, when the port P2 has three surplus vehicles redistributed to other ports, it is still left with two vehicles in surplus. Even after meeting the predicted starting trip Tf2 occurring next, the port P2 has one vehicle in surplus. Thus the port P2 has three vehicles that may be redistributed, and the redistribution is feasible. Meanwhile, when the port P5 has two surplus vehicles redistributed, it is left with one vehicle. After meeting the demand of the predicted starting trip Tf5 occurring next, the port P5 has no surplus vehicle left so that vehicle redistribution is deemed unfeasible.

Preferably, vehicles should be redistributed to ports P short of vehicles from the nearest ports P. If the port P5 is not subject to any new starting demand, then both the port P2 and the port P5 may have their vehicles redistributed. Vehicles are redistributed from whichever port is the closest to any vehicle-lacking port. It is assumed here that the ports P1 and P3 short of vehicles are closer to the port P2 than to the port P5. On that assumption, two vehicles are moved from the port P2 to the port P1 and one vehicle from the port P2 to the port P3.

Figure 4:
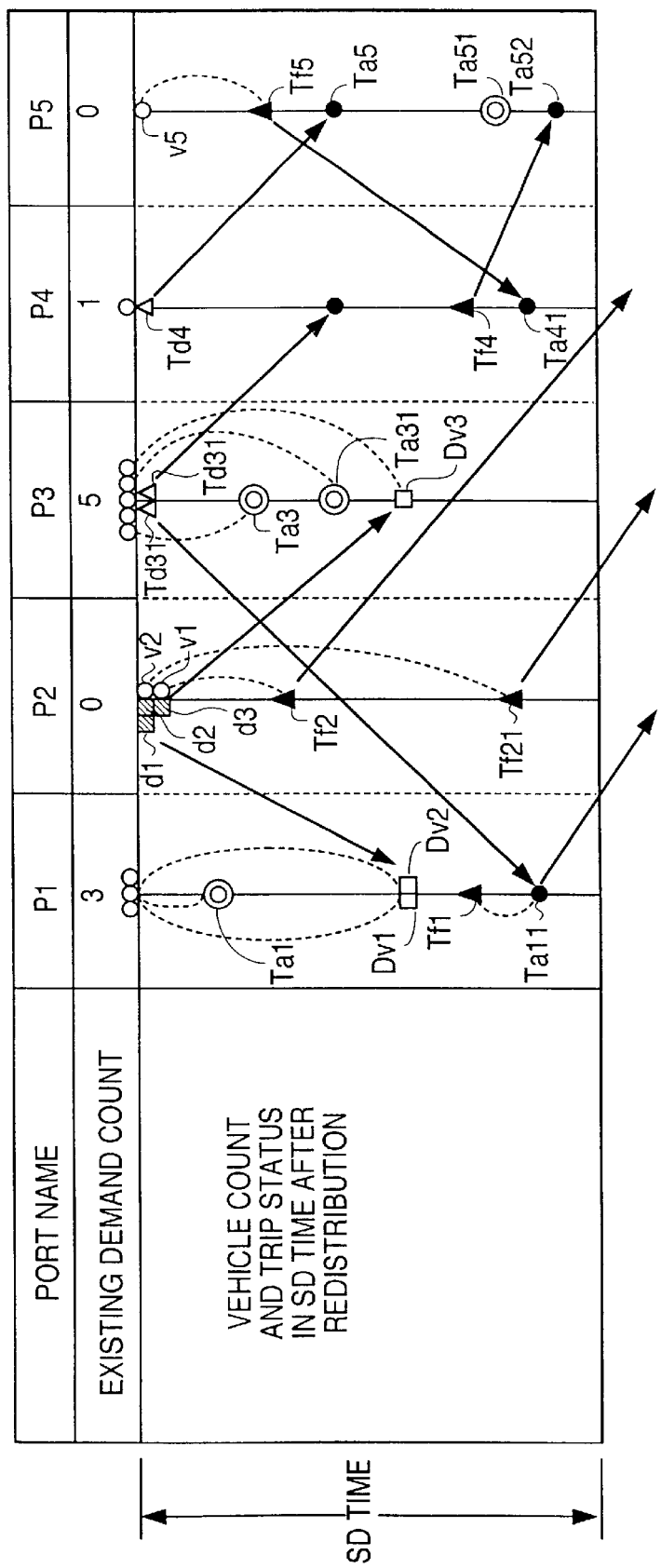
FIG. 4 is a table illustrating passenger demands and numbers of vehicles in all ports after reallocation of the vehicles.

FIG. 4 is a schematic diagram depicting how the number of vehicles varies at each port P in the SD time following vehicle redistribution based on the rearrangements above. In FIG. 4, the first user representing the current demand at the port P1 may ride a vehicle corresponding to the arriving trip Ta1. The second and the third users may ride two vehicles (Dv1, Dv2) redistributed from the port P2. The user representing the predicted starting trip Tf1 may ride a vehicle provided by the arriving trip Ta11.

The port P2 has two vehicles (d1, d2) redistributed to the port P1 and one vehicle (d3) moved to the port P3. The user corresponding to the predicted starting trip Tf2 may ride a currently available vehicle (V1), and the user representing the predicted starting trip Tf21 may ride another currently available vehicle (V2).

The port P3 with its currently available two vehicles can immediately meet two of its five demands. That is, the first and the second users may ride vehicles represented by the starting trips Td3 and Td31. The third and the fourth users may ride vehicles provided by the arriving trips Ta3 and Ta31. The fifth user may ride a vehicle (Dv3) redistributed from the port P2.

The port P4 with its currently available one vehicle can immediately meet one demand. That is, the user may ride a vehicle of the starting trip Td4. Another user corresponding to a predicted starting trip Tf4 may ride a vehicle of the arriving trip Ta4. The port P4 is shown here receiving an arriving trip Ta41, which stems from the predicted starting trip Tf5 originated at the port T5 and which was not taken into consideration for vehicle redistribution because it was not predictable at the port P4.

The port P5 has one vehicle available but is subject to no demand. This means that a starting trip will not occur immediately. The user corresponding to the predicted starting trip Tf5 may ride the existing vehicle V5. Vehicles of the subsequent arriving trips Ta5 and Ta51 remain undistributed. The port P5 is shown getting an arriving trip Ta52, which stems from the predicted starting trip Tf4 originated at the port P4 and which was not taken into consideration for vehicle redistribution because it was not predictable at the port P5. Alternatively, the arriving trip Ta52 may be taken into account for vehicle redistribution based on statistical data.

As a result of the vehicle redistribution above, the ports P1 through P3 meet all demands in the SD time without surplus or shortage of vehicles. The port P4 has one excess vehicle left and the port P5 has three vehicles left in surplus. In the above example, all demands have been met in the current SD time. If there are any vehicles for which the demands were not met within the SD time in question, they will be carried over to the vehicle redistribution process in the next SD time. If a maximum waiting time is determined beforehand, and if that maximum waiting time is exceeded in the current SD time, demands are met by redistributing available vehicles, including the vehicles at the ports P, that were determined earlier not to be subject to vehicle redistribution.

Figure 5:
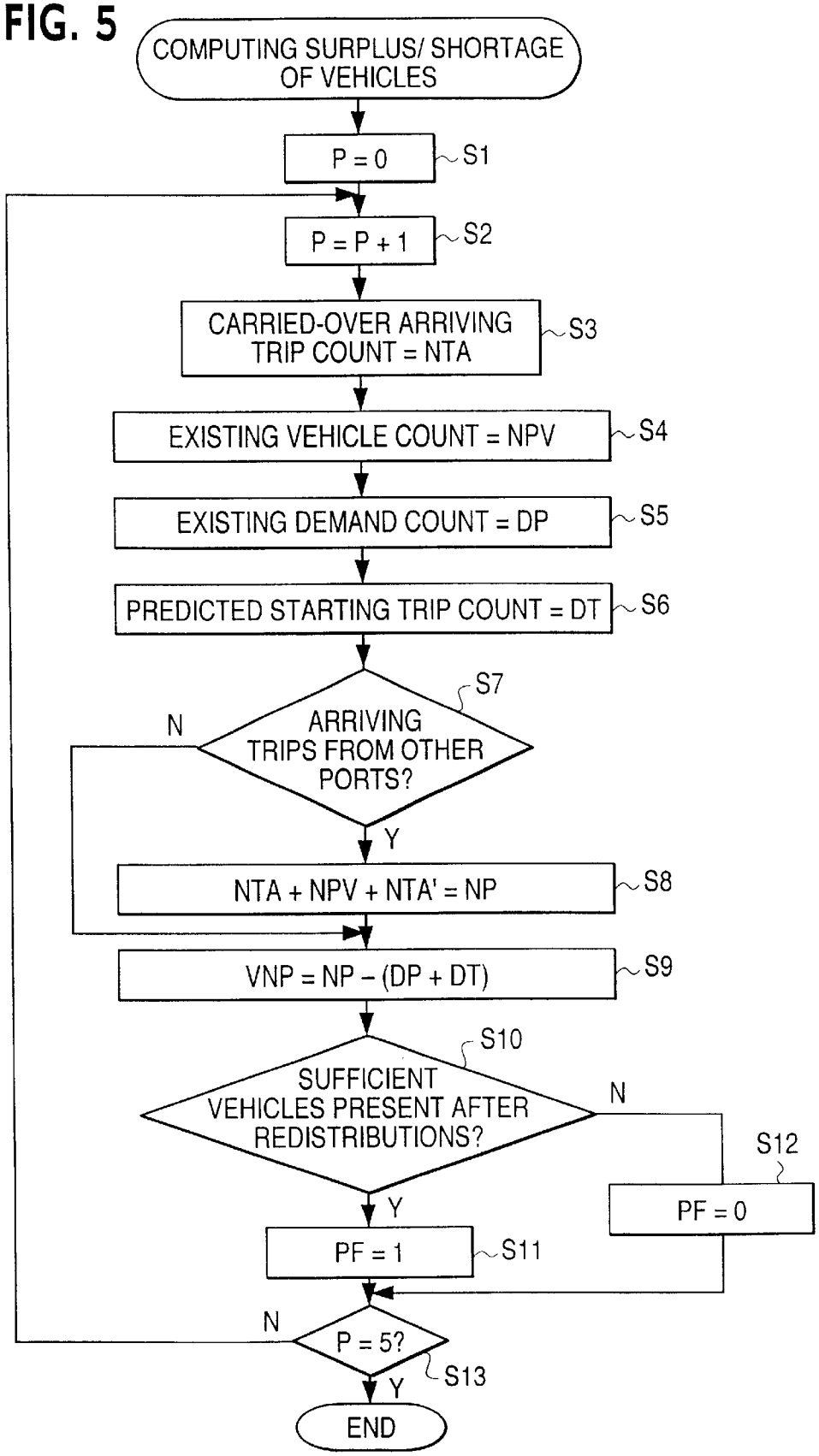
FIG. 5 is a flowchart of an algorithm for determining shortages and excesses of vehicles at the ports.

The above processing of vehicle redistribution will now be described with reference to a flowchart. FIG. 5 is a flowchart of steps for computing any surplus or shortage of vehicles being distributed. In step S1, of FIG. 5, a parameter P (representing a given port) is set equal to 0. In step S2, the parameter P is incremented by 1. The steps that follow concern the port P represented by the parameter P, e.g. P1, P2.

In step S3, the number of carried-over arriving trips, i.e., the number of arriving trips based on the starting trips that had occurred up to the preceding computation process, is set to a parameter NTA. In step S4, an existing vehicle count is set to the parameter NPV. In step S5, an existing demand count is set to a parameter DP. In step S6, a predicted starting trip count is set to a parameter DT.

In step S7, a check is made to see if any arriving trips occur in the current SD time. The check is based on computations verifying whether any starting trips occur at any other ports, whether the destination information included a demand that the starting trip include the one port, and whether any of such arriving trips will reach the one port within the current SD time. The computations take into account the known distances between the ports and the expected travel speeds of the vehicles involved.

If any arriving trips are detected in step S7, step S8 is reached. In step S8, the number of arriving trips (NTA') is added to the arriving trip count NTA as well as the existing vehicle count NPV. The sum denotes an available vehicle count NP. In step S9, a surplus or shortage of vehicles is computed. Specifically, the existing demand count DP and the predicted starting trip count DT are subtracted from the available vehicle count NP in order to acquire a surplus/shortage of vehicles.

In step S10, a check is made to see if the number of available vehicles following vehicle redistribution is sufficient. The decision of step S10 is made on the basis of whether there are any vehicles left after redistribution of the vehicles judged to be in surplus upon computation of the surplus/shortage of vehicles and whether these remaining vehicles are enough to meet demands that may subsequently occur. If the result of the check in step S10 is affirmative, step S11 is reached.

In step S11, a flag PF is set to indicate that vehicle redistribution is feasible. If vehicle redistribution is deemed unfeasible, step S12 is reached and the flag PF is cleared. In step S13, a check is made to see if the parameter P has reached 5, i.e. whether the surplus or shortage of vehicles has been computed for all the ports. If the result of the check in step S13 is negative, step S2 is reached again, and the computing process is repeated until the parameter P is found to have reached 5, covering all of ports P1 through P5.

Figure 6:
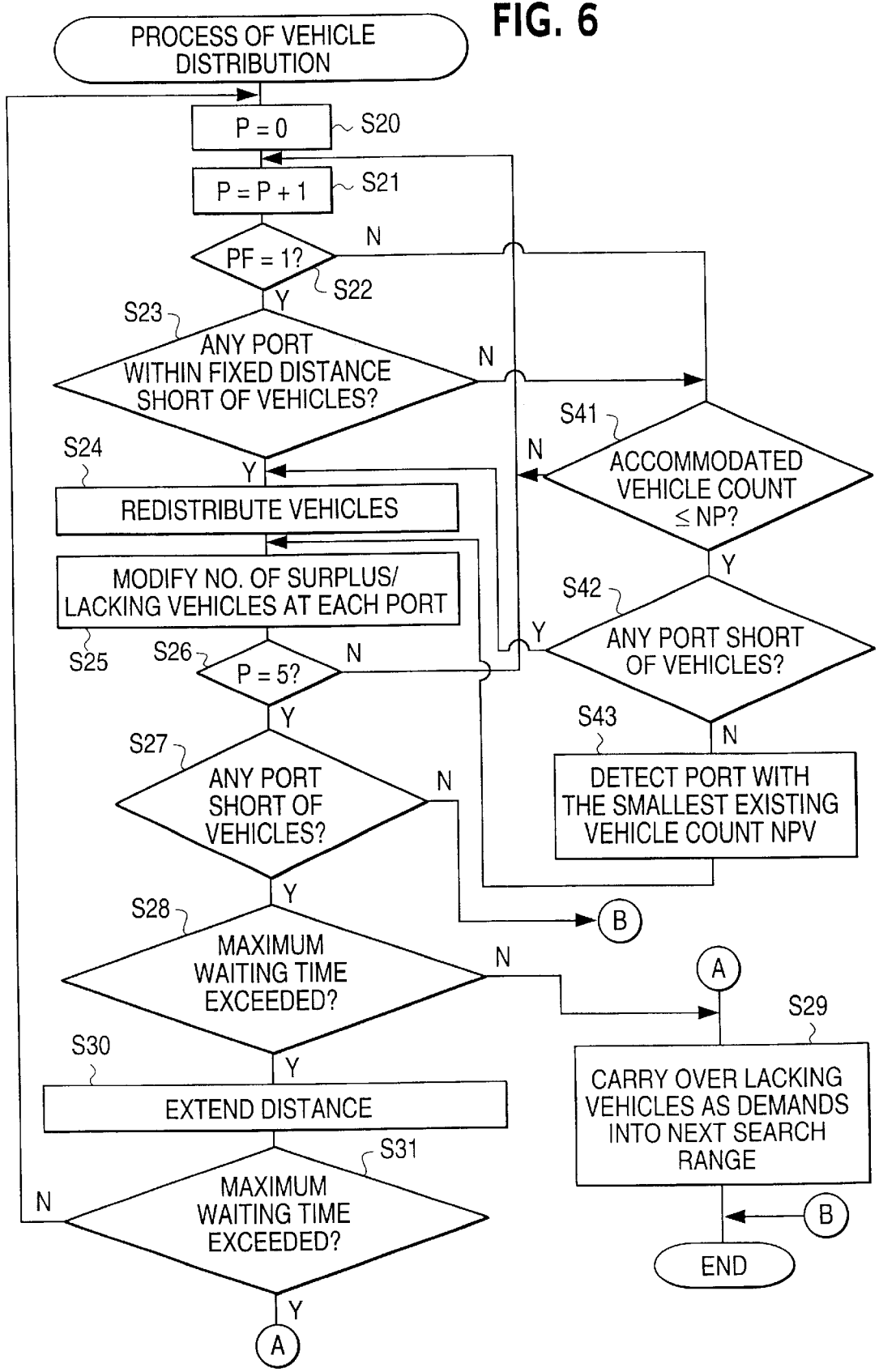
FIG. 6 is a flowchart of an algorithm for accomplishing reallocation of the vehicles based upon the results of flowchart in FIG. 5.

Now, with reference to the flowchart of FIG. 6, a description of how vehicles are redistributed on the basis of the computation of a surplus or a shortage of vehicles will be given. In step S20, the parameter P (representing a given port P) is set equal to 0. In step S21, the parameter P is incremented by 1. In step S22, a check is made to see if the flag PF is set indicating the presence of available vehicles at the port P for redistribution. If the flag PF shows vehicle redistribution to be feasible, step S23 is reached. In step S23, a check is made to see if any port within a predetermined distance from the port P lacks vehicles. The check of step S23 is intended to make sure that any available vehicles are redistributed preferentially to the nearest port within the predetermined minimum distance from each port having surplus vehicles.

If the result of the check in step S23 is affirmative, step S24 is reached. In step S24, vehicles are redistributed from the port P in question to other ports short of vehicles. There may be cases, however, in which vehicles are in fact unavailable at the moment despite the vehicles being counted as available within the SD time. Thus only those vehicles that are currently available will be redistributed. The redistribution of vehicles is followed by step S25. In step S25, the number of surplus or lacking vehicles at each port is changed to reflect the altered number of vehicles following the redistribution.

If the result of the check in either step S22 or step S23 is negative, i.e. if the port in question has no vehicles that may be redistributed or if there is no port short of vehicles within the predetermined distance of the port, then step S41 is reached.

In step S41, a check is made to see if the number of accommodated vehicles CAP is at most the predicted number of vehicles NP available in the SD time. If the result of the check in step S41 is affirmative, i.e., if more vehicles than can be accommodated are expected to arrive at the port within the SD time, then step S42 is reached. In step S42, a check is made to see if there are any other ports short of vehicles. If such a port is detected, step S24 is reached in which vehicles are redistributed to that port.

If there is no port short of vehicles, step S42 is followed by step S43. In step S43, the port currently having the fewest vehicles is detected. When the port with the smallest number of vehicles is determined, step S24 is reached in which vehicles are redistributed to that port. After the vehicle redistribution, step S25 is reached in which the number of surplus or lacking vehicles at each of the ports is updated using their latest vehicle counts.

If steps S41 through S43 have led to a judgment that the one port is incapable of accommodating the existing number of vehicles plus the predicted number of arriving vehicles, vehicles are redistributed to a vehicle lacking port that may not be located in the vicinity. Such redistribution prevents congestion of vehicles at the one port due to its lack of accommodating space. If there is no port short of vehicles, excess vehicles are redistributed to the port with the smallest number of existing vehicles. This again suppresses congestion at the one port.

In step S26, the parameter P is checked to see if all ports have been processed. If the result of the check in step S26 is affirmative, step S27 is reached. In step S27, a check is made to see if there still exist ports short of vehicles. If no port is found to be short of -vehicles in step S27, the processing is terminated. If any port is found to lack vehicles, step S28 is reached. In step S28, a check is made to see if a predetermined maximum waiting time is exceeded in which no vehicles are to be redistributed within the current SD time. If the waiting time is not exceeded, step S29 is reached. In step S29, the lacking vehicles are carried over as demands into the next SD time. That is, these vehicles persist as existing demands in the next process of computing the surplus or shortage of vehicles.

If the maximum waiting time is exceeded, a search is made for surplus vehicles at more distant ports. Specifically, a longer distance is established in step S30 to expand the range of ports subject to the search. With the applicable distance thus extended, a remote port may be found to possess surplus vehicles, but an attempt to redistribute vehicles from that port may be judged to exceed the maximum waiting time. Given that possibility, in step S31, a check is made to see if the maximum waiting time is exceeded in an attempt to resolve the shortage of vehicles through vehicle redistribution from any port within the newly established distance.

If the maximum waiting time is found to be exceeded in step S31, the attempt to redistribute vehicles from faraway ports is abandoned and step S29 is reached. In step S29, arrangements are made so that the shortage of vehicles will be replenished in the next SD time. If the maximum waiting time is not found to be exceeded in step S31, step S20 is reached again. In step S23 following step S30, a check is made to see if any port within the newly extended distance from the port P lacks vehicles.

To further explain steps S41 through S43 executed above, if the sum of the existing vehicle count and the predicted arriving vehicle count is judged to exceed the accommodating capacity of the one port, then vehicles are redistributed to a vehicle-lacking port that may not be located in the vicinity, whereby congestion at the one port is averted. If no port is found to lack vehicles, vehicles are redistributed to the port currently having the fewest vehicles so as to avoid congestion at the one port. If a plurality of ports are each found to have a small number of vehicles, vehicles may alternatively be redistributed to the nearest of these ports.

Below is a description of an algorithm for setting the SD time. FIG. 7 is a schematic diagram showing typical time periods required to redistribute vehicles among the ports involved. As shown in FIG. 7, it takes a maximum of 30 minutes to redistribute a vehicle from one port to the farthest port, and a minimum of 5 minutes from one port to the nearest port. As evident from FIG. 7, a number of vehicles determined to be redistributed in an SD time of less than five minutes will not reach their destination ports within that SD time.

In an SD time of at least five minutes and less than seven minutes, vehicles may be redistributed only between the ports P1 and P2. In an SD time of at least seven minutes and less than nine minute, vehicles may be redistributed only between the ports P1 and P2 and between the ports P2 and P3. Examining the SD time frame in this manner reveals that vehicles may be redistributed among all ports in an SD time of at least 30 minutes. As described, to redistribute vehicles requires establishing an SD time equivalent to at least a minimum period of time needed to move vehicles between ports P. In the example of FIG. 7, the SD time is at least five minutes.

The SD time should be shorter than the maximum waiting time for a vehicle user. Given a maximum waiting time of 15 minutes, the SD time should be set for less than 15 minutes. In that case, vehicles may be redistributed between the ports P1 and P2; between the ports P2 and P3; between the ports P3 and P4; and between the ports P4 and P5. If vehicles are allowed to travel automatically for redistribution, the time it takes to travel between ports is obviously determined by the velocity of such automated movement.

Described below is an algorithm for determining the SD time in connection with the number of vehicles deployed. Where as many vehicles as the total number of demands are allocated to a given port P, there is obviously no need to redistribute any vehicles to that port P. The smaller the number of vehicles allocated to a port, the greater the number of vehicles to be redistributed to that port. It follows that if a large number of vehicles are deployed to meet only a limited need for redistributing vehicles, the SD time tends to be shorter and the waiting time at each port P is more likely to be reduced.

Since deployment of an unlimited number of vehicles is not economical, it is desirable to reduce the vehicle count by prolonging the SD time and by making good use of the vehicle redistribution process. An inordinately long SD time coupled with a small number of deployed vehicles can prolong waiting time. Although longer SD time periods can stretch waiting time, an increasing number of arriving trips are expected from other ports so that the number of redistributed vehicles becomes relatively small. In any case, an optimum SD time should be determined through an overall trade-off between the number of deployed vehicles, the number of redistributed vehicles, and the waiting time.

FIG. 8 is a graphic representation illustrating relations between the number of deployed vehicles and the number of redistributed vehicles using the SD time as a parameter, and FIG. 9 is a graphic representation depicting relations between the number of deployed vehicles and the average waiting time also using the SD time as a parameter. In FIG. 8, on the assumption that the number of deployed vehicles is at most "a" and that the number of redistributed vehicles is at most "A," reducing the deployed vehicle count lowers the redistributed vehicle count in the same SD time (assuming SD1>SD2>SD3>SD4).

On the other hand, reducing the deployed vehicle count prolongs the average waiting time, as shown in FIG. 9. That is, the number of redistributed vehicles declines when the number of deployed vehicles is reduced, which results in a prolonged waiting time.

It follows that to keep the average waiting time from exceeding its upper limit B requires increasing the number of redistributed vehicles. This in turn necessitates shortening the SD time. In other words, to reduce the redistributed vehicle count requires prolonging the SD time; to minimize the average waiting time requires shortening the SD time.

If points L, M and H are established illustratively as shown in FIGS. 8 and 9, both the upper limit B of the average waiting time and the maximum redistributed vehicle count A are satisfied at each of the points. Thus any one of the three factors, i.e., deployed vehicle count, redistributed vehicle count and average waiting time, may be selected to receive priority in accordance with what is specifically needed at a given point in time (e.g., by a business-related decision).

What follows is a description of how an optimum number of vehicles can be deployed at the ports, according to the invention. If it is desired to reduce the waiting time to zero despite differences between demands that actually occur at each port on the one hand and the demands deduced from predicted starting trips based on statistical ride demand data on the other hand, each port need only have one vehicle in theory every time a single demand has occurred.

Meanwhile, if a demand has occurred at a given port and if there are enough vehicles deployed so that a vehicle may be redistributed from the port of the demanded destination to the port having generated that demand, then the two ports are always furnished with available vehicles upon elapse of the time required for the vehicle movement between the two ports. That is, the number of vehicles deployed at all ports is again brought to the initial status.

Suppose that the vehicle travel time is constant between all ports, that a demand has occurred at a given port, and that a vehicle is redistributed from any one of the other ports to the port having generated the demand. In such a case, if vehicles are redistributed between ports to replenish their vehicle counts as described above, then all ports acquire vehicles upon elapse of the vehicle travel time. If only one demand occurs in each vehicle travel time between ports, then deploying one vehicle at each port will reduce the waiting time theoretically to zero.

It follows that, in practice, the number of all deployed vehicles may be determined by finding out the number of predicted starting trips occurring in each vehicle travel time within the entire area, on the basis of the number of all predicted starting trips per day.

An example in which specific numbers are simulated will now be described. FIGS. 10A and 10B are schematic diagrams showing travel times among the ports P1 through P5, whereby area sizes are determined. FIG. 10A lists typical travel times in effect when users drive vehicles (at 48 km/h), and FIG. 10B gives typical travel times in effect when vehicles travel unattended (at 16 km/h). In this example, a total of 75 vehicles are deployed, with each port being assigned 15 vehicles. The maximum average waiting time is set for one minute because this simulation example gives priority to the waiting time.

Figure 11:
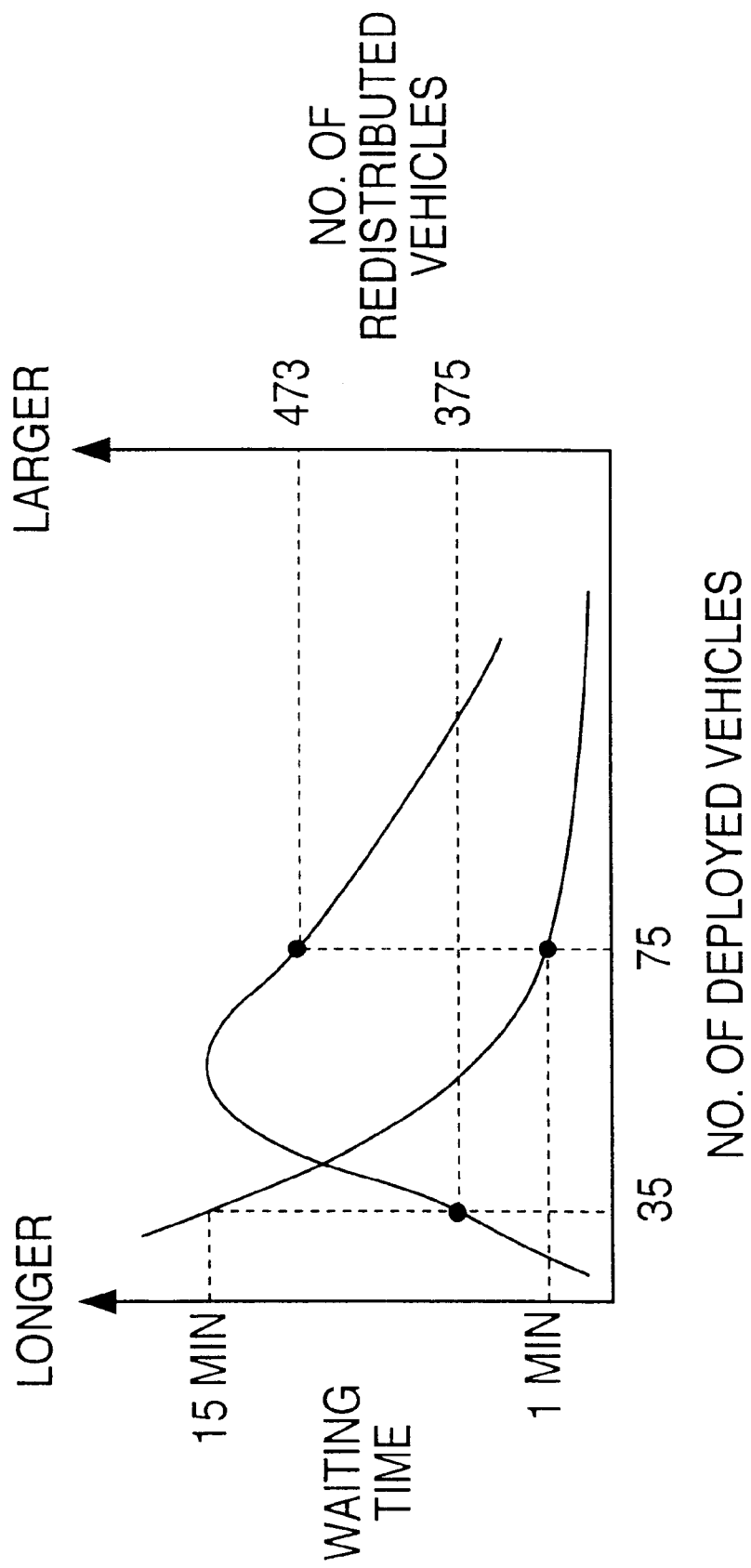
FIG. 11 is a graph illustrating relations between the number of deployed vehicles, the average waiting time and the number of reallocation vehicles.

FIG. 11 is a graphic representation depicting relations between the number of deployed vehicles, the waiting time, and the number of redistributed vehicles under the simulation conditions mentioned above. The SD time is set for 20 minutes. Where the maximum average waiting time is set for one minute in FIG. 11, the number of vehicles needed to be deployed is 75, and the number of vehicles redistributed under these conditions is 473.

Figure 12:
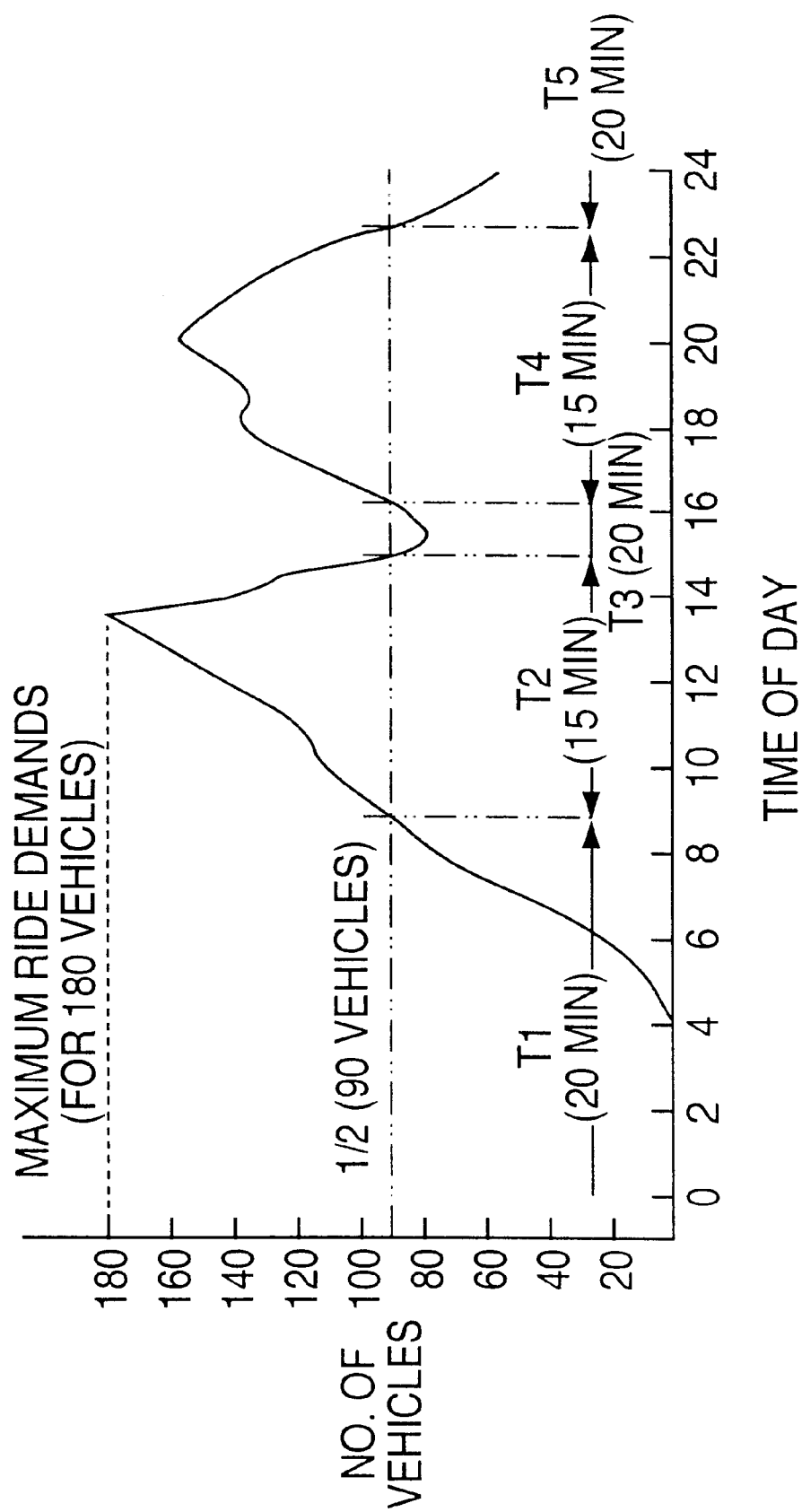
FIG. 12 is a graph illustrating changes in passenger demands in a day.

The SD time need not be fixed for the whole day and may be varied depending on the predicted ride demands. FIG. 12 is a graphic representation showing actual ride demands on a typical day. The day's total ride demands amount to 1,800 trips. As illustrated in FIG. 12, the ride demands typically fluctuate considerably throughout the day. When there are many ride demands, the SD time should preferably be shortened in order to maximize the number of redistributed vehicles thereby minimizing prolongation of the waiting time.

Illustratively, one-half of the maximum predicted ride demands per day may be selected as a reference level. When the predicted ride demands fall below the reference level, the SD time may be set for 20 minutes; when the predicted ride demands are on or above the reference level, the SD time may be shortened 10 to 15 minutes. If the maximum predicted ride demands are assumed to be at 180 vehicles in FIG. 12, the reference level for altering the SD time is set for 90 vehicles. Thus the SD time is set for 20 minutes in time zones T1, T3 and T5; and for 15 minutes in time zones T2 and T4.

An optimum number of vehicles to be deployed is now calculated under the above conditions of simulation. The travel time for automated vehicle runs is regarded as a reference travel time between ports. This is because the travel time for redistributing vehicles is necessarily longer due to unattended vehicle runs than when vehicles are driven by users. A simple average of the vehicle travel times listed in FIG. 10B is 14.46 minutes (about 15 min.). If the number of all predicted starting trips per day is 1,800, then approximately 18 starting trips occur every 15 minutes. This means that about 18 trips take place while both manned and unattended vehicles come and go between ports to replenish their vehicle counts.

Thus, each port need only be provided with as many vehicles as the number of predicted starting trips per average vehicle travel time between ports. More specifically, the five ports are to have 18 vehicles each, i.e. a total of 90 vehicles deployed in the area. Under this scheme, each starting trip is responded to with a vehicle redistributed from one of the ports. In theory, each port always has one available vehicle when a demand occurs.

In practice, there are a number of variables to take into account. The travel time varies between ports; the total number of starting trips occurring per day varies; demands can concentrate in certain time zones. These variables combine to prevent the waiting time from always being zero. Still, when the system is capable of redistributing vehicles by predicting starting and arriving trips based on statistical data as described above, fluctuations in the waiting time can be minimized despite deviations of actual demands from predicted values.

Figure 21:
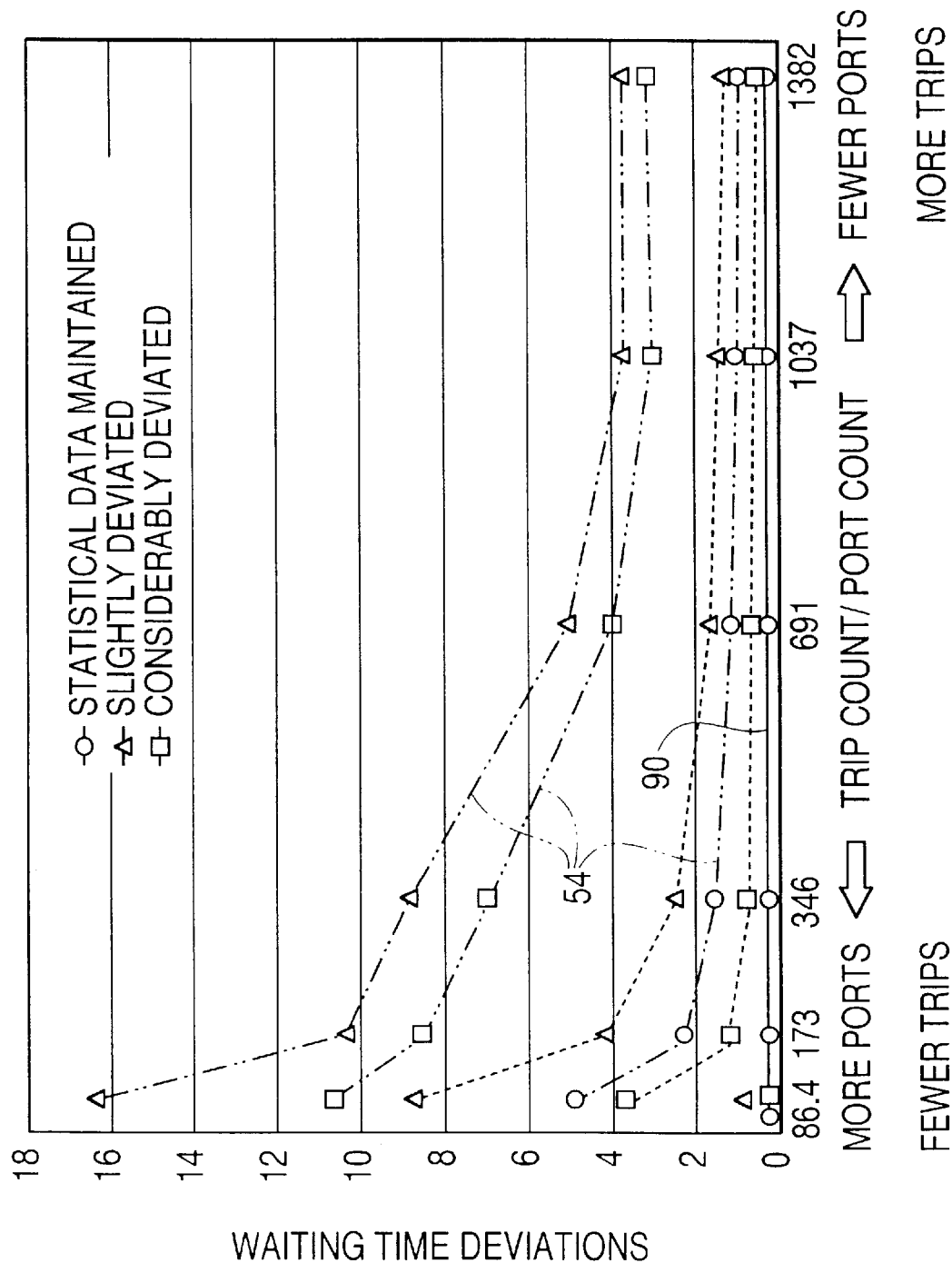
FIG. 21 is a graph illustrating deviations of waiting times per deployed vehicle count.
Figure 22:
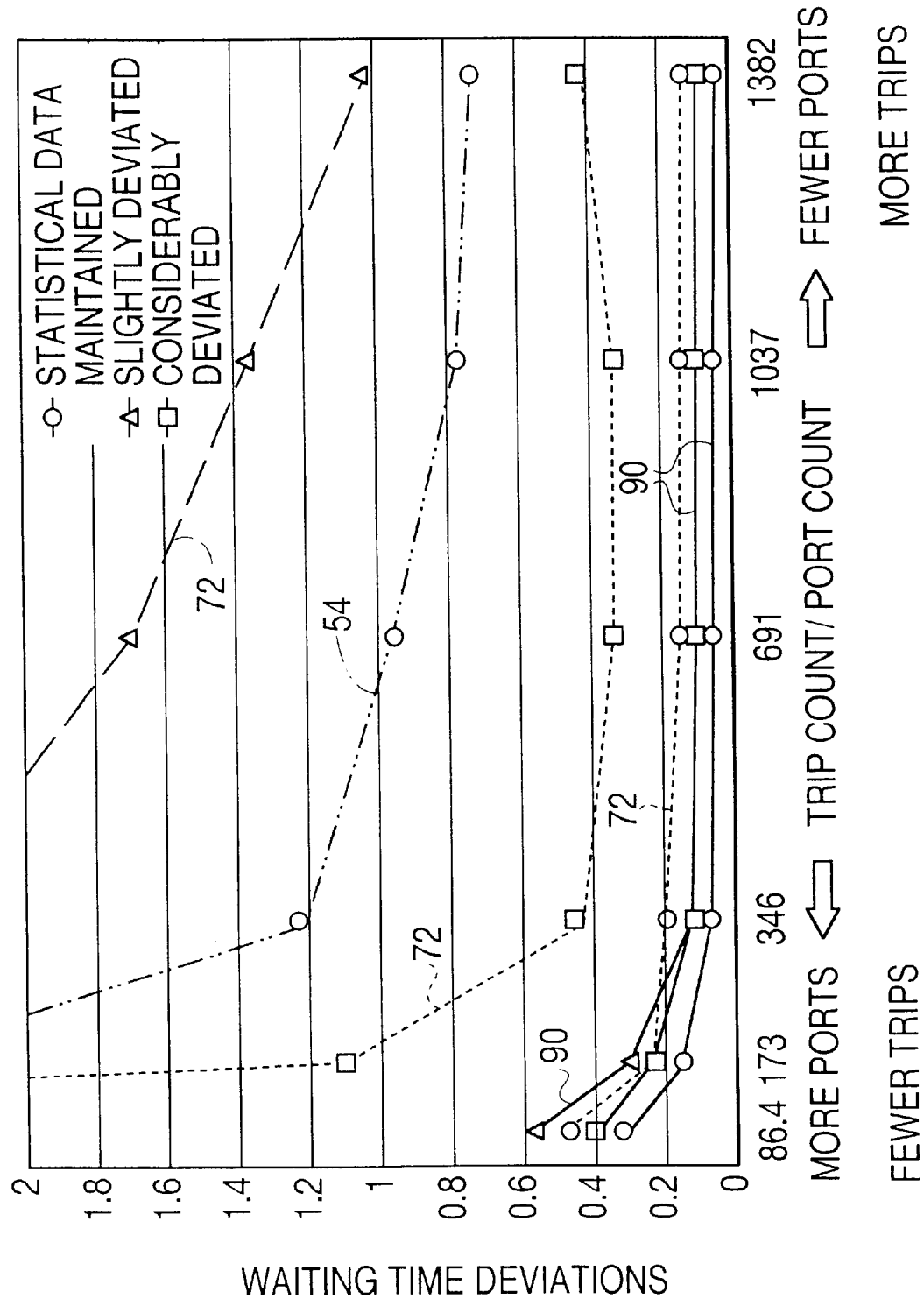
FIG. 22 is a graph also illustrating deviations of waiting times per deployed vehicle count.

FIGS. 21 and 22 are graphic representations illustrating deviations of waiting times per deployed vehicle count in the area, including deviations of actual demands (starting trips) from predicted starting trips deduced from statistical ride demand data. In FIGS. 21 and 22, the axis of the abscissa represents the number of trips divided by the number of ports. FIG. 22 is an enlarged view of the waiting time deviations in FIG. 21.

As shown in FIGS. 21 and 22, where 90 vehicles are deployed, the deviations of waiting times are small and stable, regardless of the magnitude of differences between the statistical data and the actual demands. Where the deployed vehicle count is between 72 and 54, the deviations of waiting times are quite pronounced and fluctuate considerably, if the actual demands deviate from the statistical data. If the ratio of the number of trips to the number of ports becomes small, i.e. if the number of trips is very small compared with the number of ports, the waiting time deviations are enormous. If the number of trips is 1,800 compared with the port count being 10 or less, the deviations of waiting times in connection with larger than the number of vehicles traveling between the ports P1 and P5.

One such example is shown in FIG. 10C. FIG. 10C illustrates frequencies of trips between specific ports in percentages reflecting different travel times therebetween. In this case, it is preferable to obtain not a simple average but a weighted average of the travel times between the ports. From FIGS. 10B and 10C, the average travel time is computed to be 11.91 minutes (about 12 min.). That is, a total of 1,800 trips over 20 hours translate into 18 trips approximately every 12 minutes. Thus, the five ports are to be furnished with a total of 90 vehicles.

Such different frequencies of trips between specific ports are unique to a given area. Wherever an area is set aside for the vehicle distribution system, the varying frequencies of trips may be inferred from specific features of the area or may be determined by collecting relevant data about the area.

It is thus preferable to consider different frequencies of trips between ports as well as irregular distribution of demands throughout the day in determining a vehicle's travel time between ports, as well as, the number of predicted starting trips within the travel time. The vehicle travel time between ports may be dealt with not as a simple average, but as a weighted average of varying travel times between ports, the averaging being weighted by taking different frequencies of port-to-port trips taken into account. In such a case, the duration of the day need not be limited to 24 hours.

Figure 13:
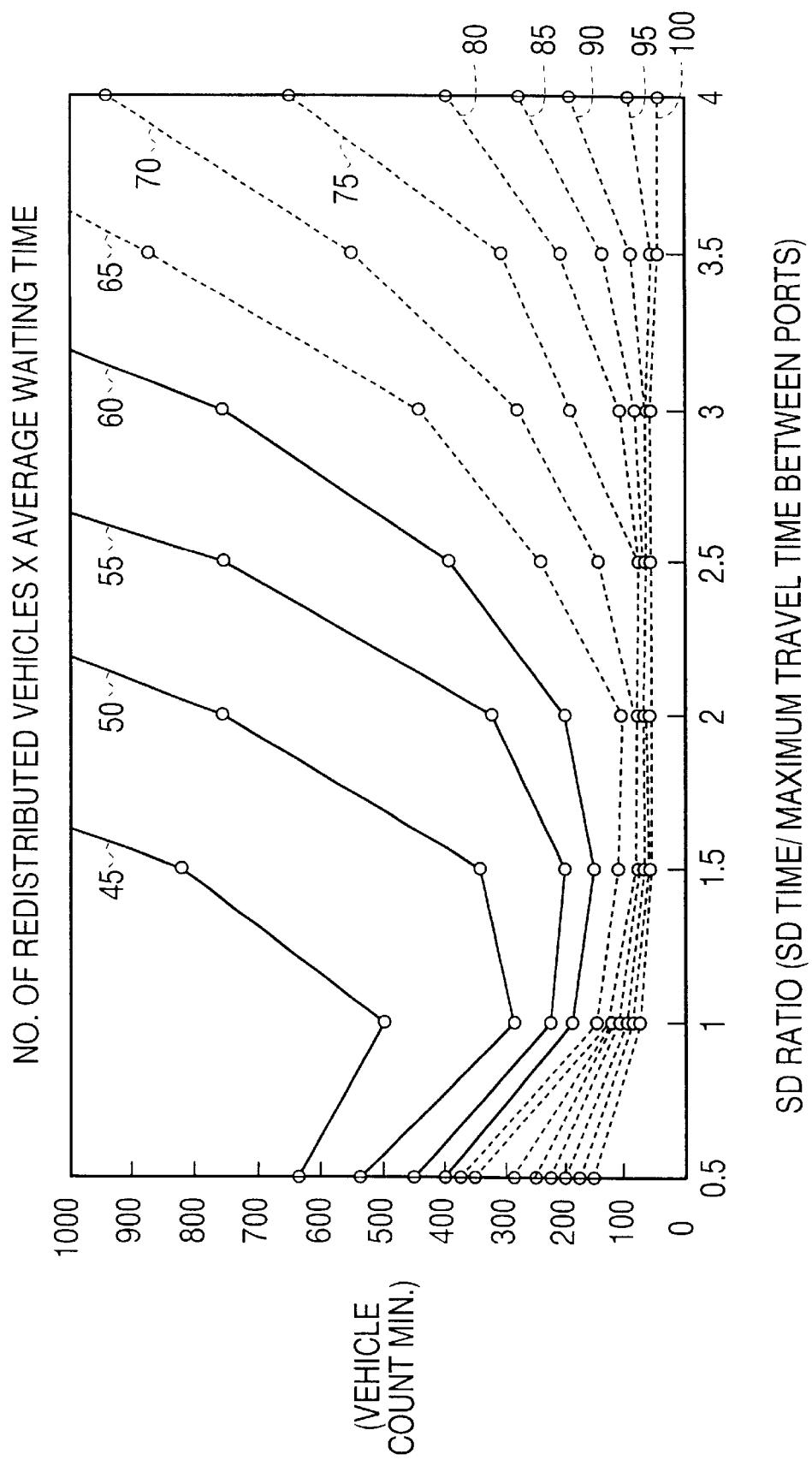
FIG. 13 is a graph illustrating a relation between a product of the number of reallocated vehicles, a deployed vehicle count, the average waiting time, and the SD time using a search ranges as a parameter.

Other criteria for setting the SD time will now be described. FIG. 13 is a graphic representation showing simulated relations between a product of the redistributed vehicle count and the average waiting time (the product is called the distribution coefficient hereunder) on the one hand, and the SD time on the other hand, using the number of deployed vehicles as a parameter. The data in FIG. 13 apply when vehicles being redistributed travel at 35 km/h. Each SD time period is indicated in terms of the ratio of the SD time in question with respect to the travel time (20 minutes) between the farthest of the multiple ports configured (the ratio is called the SD ratio hereunder). The smaller the distribution coefficient, the more efficient the system becomes. That is, because shorter waiting times signify fewer occasions on which vehicles are moved empty of riders.

As indicated in FIG. 13, the distribution coefficient is conspicuously minimal when the number of deployed vehicles is below a certain level. Specifically, in areas where the number of deployed vehicles is less than 60 and where the SD ratio is between 1 and 1.5 or thereabout, the distribution coefficient reaches its minimum level. In areas where the number of deployed vehicles is 60 or higher, the distribution coefficient is not conspicuously minimal. That is, the distribution coefficient changes little with regard to SD ratio fluctuations. In other words, in areas where a large number of vehicles are deployed, establishing the SD time according to strict criteria does not necessarily yield expected good results because of the leeway provided by the sufficient number of vehicles.

If a slightly insufficient number of vehicles are deployed to meet demands, selecting a suitable SD time makes it possible to construct an economical system with a low distribution coefficient. In the example of FIG. 13, an efficient system is constituted if, with fewer than 60 vehicles deployed, the SD ratio is set between 1 and 1.5.

In areas where the number of deployed vehicles is less than 45, the average waiting time is at least 10 minutes because there are too few vehicles to meet demands. In the latter case, the distribution coefficient reaches its minimum level when the SD ratio is 1 or thereabout.

The embodiment described above does not take into account the number of vehicles that may be accommodated at each port, i.e., the capacity of a parking lot of each port. If the number of vehicles that may be parked at each port (called the accommodating capacity hereunder) is small while the total number of deployed vehicles within the area is considerable, congestion can occur when vehicles are coming in and going out. This can result in a prolonged waiting time despite the large number or vehicles deployed.

Figure 23:
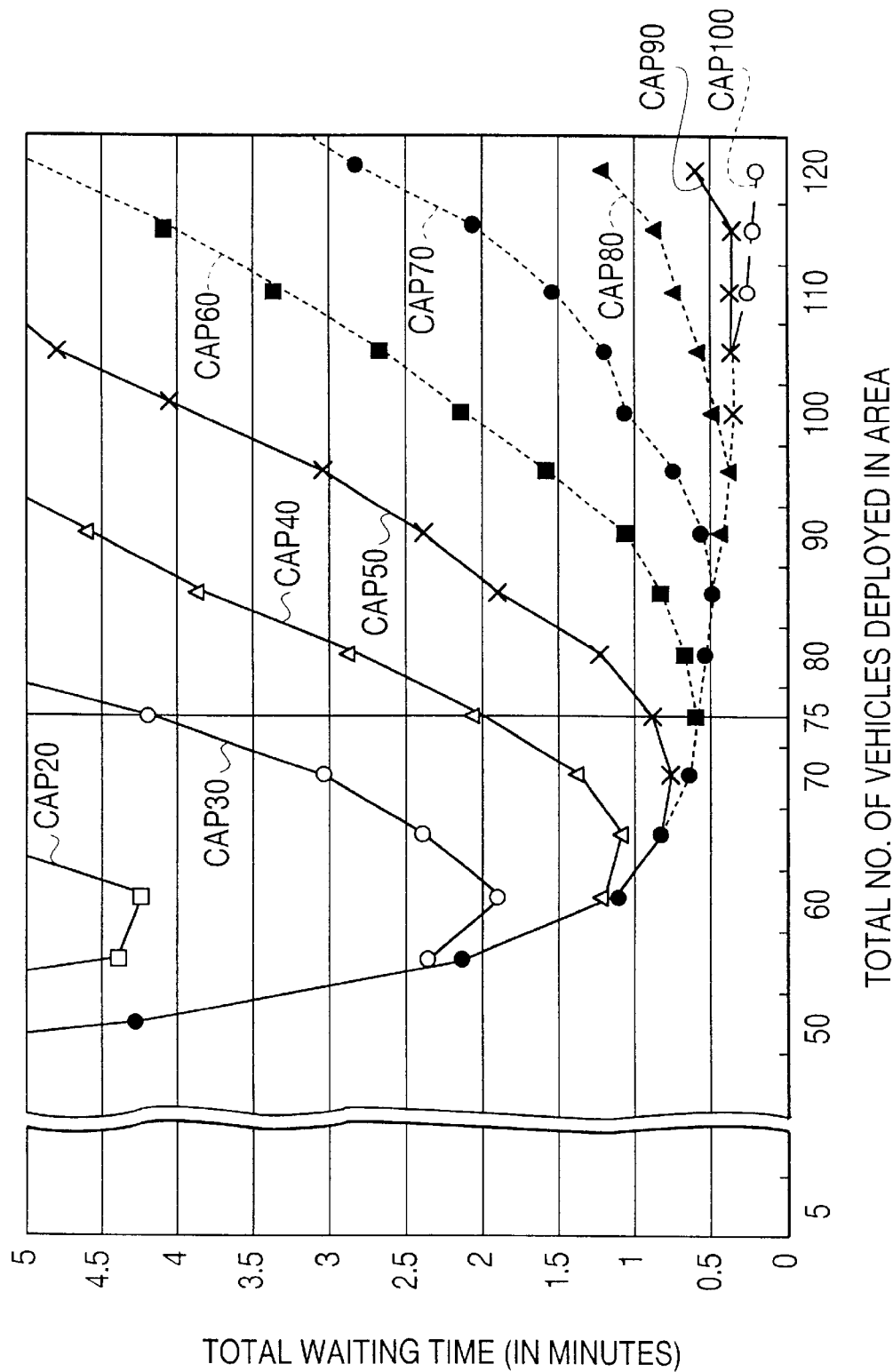
FIG. 23 is a graph illustrating a relation between the waiting time and the number of deployed vehicles using the accommodating capacity as a parameter.

FIG. 23 is a graphic representation showing relations between the waiting time and the number of vehicles using the accommodating capacity as a parameter. As indicated in FIG. 23, there are certain vehicle counts at which the waiting time is minimal, and increasing the number of vehicles does not necessarily shorten the waiting time. Illustratively, if the number of all deployed vehicles is 75, the waiting time is about 4 minutes for the accommodating capacity (CAP) of 30 vehicles, 2 minutes for the capacity of 40 vehicles, and 1 minute for the capacity of 50. If the number of accommodated vehicles were 20, the waiting time would be too long to be shown in the figure.

Figure 24:
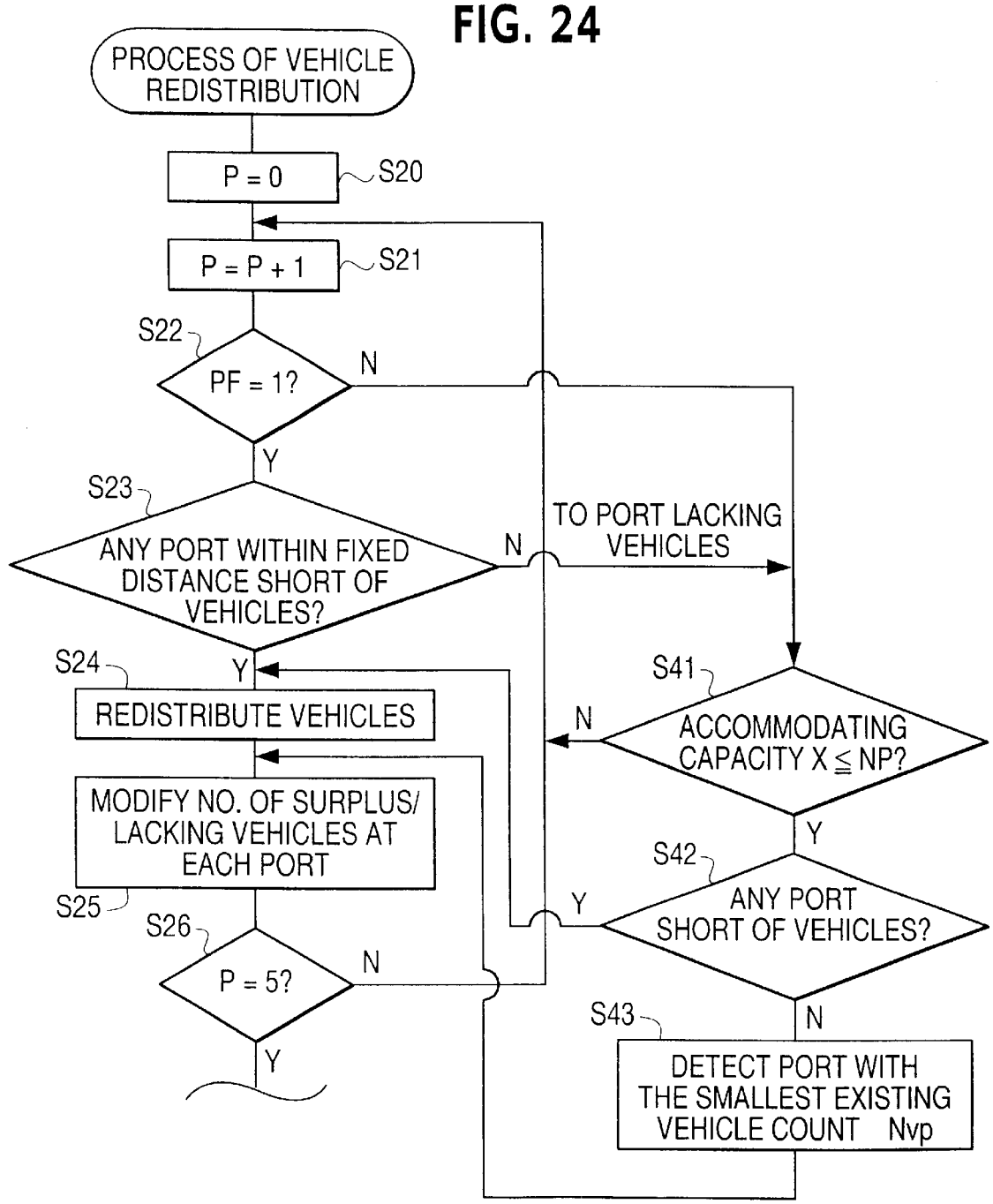
FIG. 24 is a flowchart of steps constituting a modification of the vehicle redistribution process.

In view of the difficulty above, a second embodiment described below is designed to redistribute vehicles by taking the accommodating capacity of each port into consideration. FIG. 24 is a flowchart of steps constituting another process of vehicle redistribution, a modification of the vehicle redistribution process in FIG. 6. Of the step numbers in FIG. 24, those already used in FIG. 6 designate like or corresponding steps.

In FIG. 24, if the result of the check in step S22 or S23 is negative, i.e. if the port in question has no vehicles that may be redistributed or if no port within the predetermined short distance lacks vehicles, then step S41 is reached. In step S41, a check is made to see if the accommodating capacity CAP is at most the number of vehicles NP that may be used in the SD time.

If the result of the check in step S41 is affirmative, i.e. if a number of vehicles greater than the accommodating capacity of the port in question are predicted to arrive within the SD time, then step S42 is reached. In step S42, a check is made to see if any other port lacks vehicles. If any port is found to be short of vehicles, step S24 is reached, in which vehicles are redistributed to the port in question.

If there are no ports short of vehicles, step S42 is followed by step S43. In step S43, the port currently having the fewest vehicles is detected. When the port with the smallest existing vehicle count is identified, step S24 is reached. In step S24, vehicles are redistributed to the port in question. After vehicle redistribution, step S25 is reached. In step S25, the number of excess or lacking vehicles at each port is updated to reflect the latest vehicle counts. Step S26 is followed by the same process as that of steps S27 through S31 in FIG. 6; the process is omitted from FIG. 15 and will not be described further.

If the sum of the existing vehicle count and the predicted arriving vehicle count is judged to exceed the accommodating capacity of the one port, vehicles are redistributed to a vehicle-lacking port that may not be located in the vicinity, whereby congestion at the one port is averted. If no port is found to lack vehicles, vehicles are redistributed to the port currently having the fewest vehicles so as to avoid congestion at the one port. If a plurality of ports are each found to have a small number of vehicles, vehicles may alternatively be redistributed to the nearest of these ports.

Figure 25:
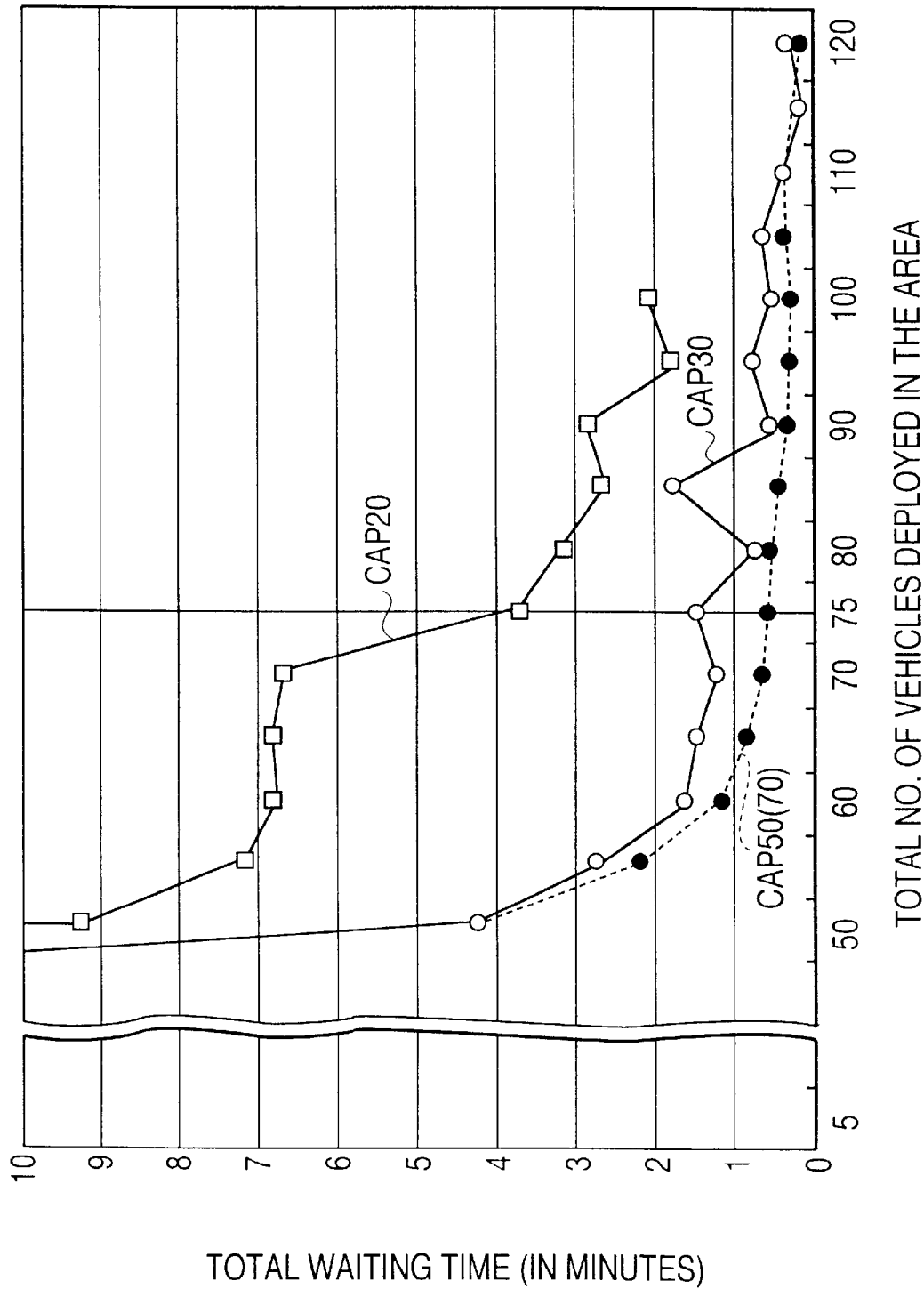
FIG. 25 is a graph illustrating a relation between the waiting time and the number of deployed vehicles within the area, with the accommodating capacity of each port being used as a parameter.

FIG. 25 is a graphic representation showing relations between the waiting time with accommodating capacity taken into account and the number of vehicles deployed within the area, the accommodating capacity of each port being used as a parameter. As depicted in FIG. 25, the larger the number of deployed vehicles, the shorter the waiting time at all ports regardless of the accommodating capacity thereof. In particular, even where the accommodating capacity is as small as 20 vehicles, the waiting time is at most 4 minutes provided the number of vehicles is at least 75.

As described, where vehicles are redistributed with the accommodating capacity at each port taken into consideration, the waiting time can be reduced in keeping with the number of deployed vehicles. The deployed vehicle count is determined by taking into account both the waiting time and the number of vehicles to be redistributed. Unlike the case of FIG. 23 in which a growing number of deployed vehicles causes the waiting time to start getting longer at some point, the setup of FIG. 25 allows the number of deployed vehicles to be determined within a wide range illustratively based on business decisions.

The embodiment described above predicts starting trips based on past ride demands (statistical data) stored in the predicted starting trip storing unit 110, and redistributes vehicles according to the predictions thus acquired. However, actually generated demands can deviate from raw statistical data, and appreciable degrees of such variance can lead to wasteful redistribution of vehicles.

Figures 14, 15:
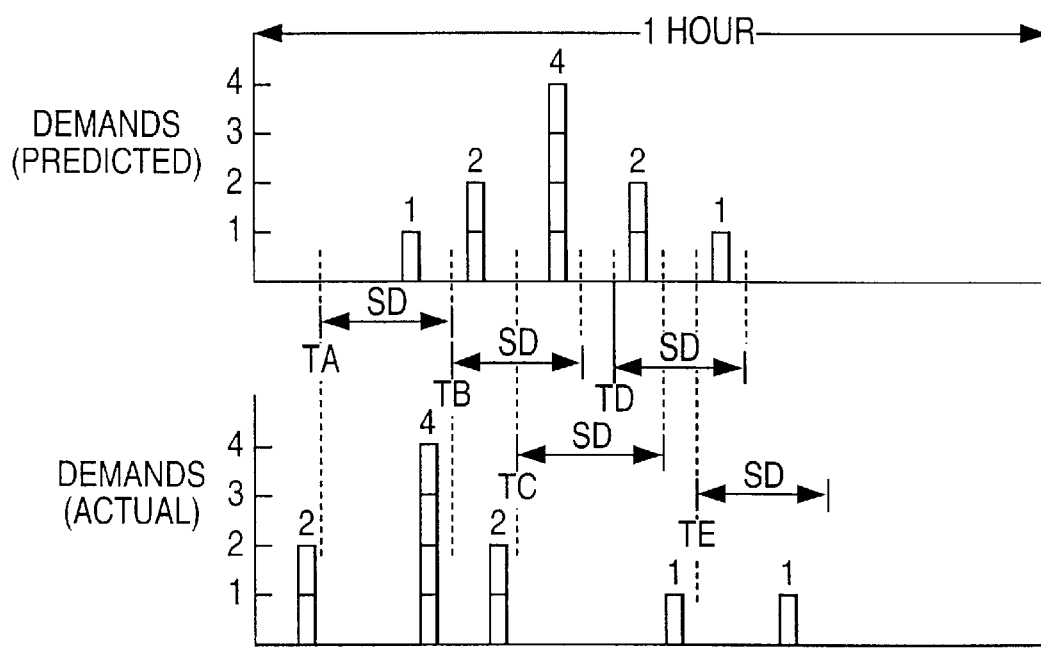
FIG. 14 is a graphic representation of demands that occurred in the past as opposed to demands currently generated.
FIG. 15 is a table indicating how vehicles are typically redistributed on the basis of raw statistical data.

Described below is an example of a vehicle redistribution process caused by a discrepancy between statistical ride demand data and actual demands. FIG. 14 is a graphic representation of demands that occurred in one hour in the past as opposed to demands currently generated. FIG. 15 is a schematic diagram indicating how vehicles are redistributed at one port on the basis of the data in FIG. 14. In both FIGS. 14 and 15, demands for two vehicles have already occurred at a judging time TA, and past demands allow a starting trip of one vehicle to be predicted, occurring from the time TA into the SD time. If one vehicle is assumed to be currently available, then one of the three demands is met, and redistribution instructions for the other two vehicles are issued.

By a judging time TB, the vehicles designated for redistribution at the preceding judging time TA have been redistributed, bringing the vehicle count to 3. With two vehicles allocated to meet the two demands, the existing vehicle count reaches 1. After the two demands have been processed, another four demands occur. From the judging time TB into the SD time, predicted starting trips of six vehicles occur. Because one vehicle is currently available against the demands for 10 vehicles, redistribution instructions for nine vehicles are issued. If it is assumed that the requested nine vehicles arrive not between the judging time TB and a judging time TC, but past the judging time TC, only one vehicle currently exists as opposed to four demands. The unprocessed demands are carried over past the judging time TC.

At the judging time TC, three unprocessed demands are supplemented by two more demands, bringing the existing demand count to 5. Because there are predicted starting trips of six vehicles, the existing vehicle count of 9 is two vehicles short. This again requires issuing vehicle redistribution instructions for the missing vehicles.

In the same manner, checks are made at subsequent judging times TD and TE to see if vehicles need to be -redistributed. As shown in the figures, unlike in the preceding judgments, surplus vehicles are detected at the times TD and TE for redistribution to other ports. That is, in one hour of vehicle redistribution, four excess vehicles need to be redistributed.

The wasteful redistribution of vehicles illustrated above stems from the difference between statistical ride demand data and actual demands. The lack of measures to correlate the two kinds of data is one major reason for the defect. Given such assessment, another embodiment of the invention, to be described below, uses the statistical data not as raw data but as mean data per unit time and associates meaningfully the statistical data with actual demands for vehicle redistribution. Among others, the statistical data are grasped as probabilities of demand (starting trip) occurrence so as to reduce discrepancies between the statistical data and the actual demands.

FIG. 16 is a graphic representation showing how probabilities of demand occurrence typically vary. Based on the prediction that demands for 10 vehicles will occur per hour, the probability of demands occurring per minute may be regarded as 10/60 (1/6) vehicles. The probability is reduced whenever demands are actually generated. That is, in keeping with the demands shown occurring in the upper part of FIG. 16, the probability of demand occurrence is reduced progressively to 8/60, 4/60, 2/60 and 1/60.

The predicted starting trips mentioned above are modified by taking into account the probability of demand occurrence. FIG. 17 is a schematic diagram indicating how vehicles are typically redistributed while predicted starting trips are modified in accordance with the probability of demand occurrence. At a judging time TA, the probability is 8/60 (2/15) because two demands have occurred so far. The value represents the number of vehicles per minute, so that demands for 2.7 vehicles (rounded to 3 vehicles) are predicted for the SD time (20 minutes in this case). As a result, redistribution instructions for four vehicles are issued at the judging time TA.

At a judging time TB, four vehicles are "redistributed and one demand is met so that the existing vehicle count is 3. Because demands for four more vehicles have occurred by the time TB, the probability of demand occurrence is 4/60 (1/15). As a result, demands for 1.3 vehicles (rounded to 2 vehicles) are predicted for the SD time and redistribution instructions for three vehicles are issued at the judging time To. The redistributed vehicle count in this case is smaller by six than the vehicle count at the time TB in FIG. 15.

In like manner, demands are predicted for vehicle redistribution in accordance with the modified probability of demand occurrence. This implements a vehicle redistribution scheme with a minimum of wastefully redistributed vehicles. Illustratively, no vehicle is redistributed at a judging time TD and only one vehicle is redistributed at a judging time TE.

Figure 18:
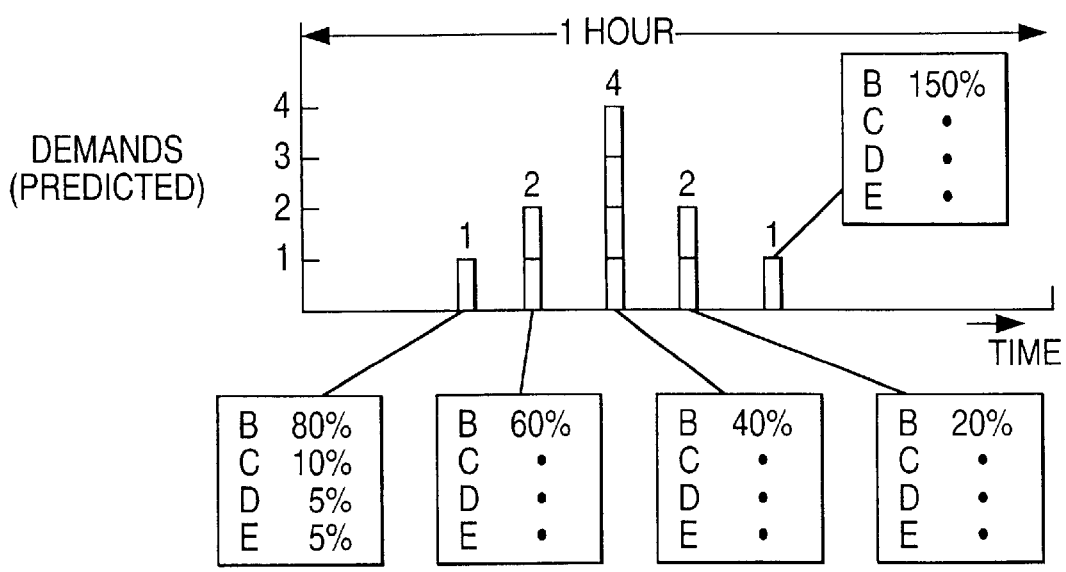
FIG. 18 is a graphic representation showing typical ratios of starting trips per destination.

Statistical ride demand data may include ratios of demands based on predicted starting trips with respect to destination ports. That is, the statistical data may comprise data regarding which port becomes a destination port at what ratio. FIG. 18 is a graphic representation showing ratios of predicted demand counts at a port P1 with regard to destination ports. As illustrated in FIG. 18, 80 percent of destinations are set to a port P2 with the first demand in a given one-hour period; 60 percent are set to the same port P2 with the next demand in the same period; and so on. For a plurality of demands occurring at the same time, FIG. 18 indicates an average ratio.

Figure 19:
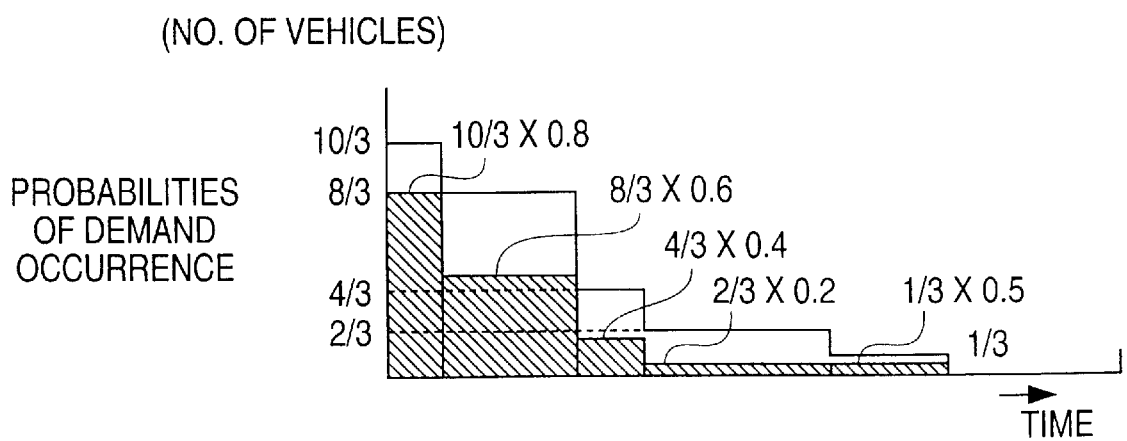
FIG. 19 is a graphic representation showing arriving trips predicted through multiplication of probabilities of demand occurrence by destination ratios.

FIG. 19 is a schematic view showing probabilities of demand occurrence juxtaposed with probabilities of demands whose destination is the port P2. In FIG. 19, each probability of demand occurrence is expressed in terms of the number of predicted starting trips, i.e., the number of predicted ride demands, in the SD time. As depicted, until a first demand actually occurs, arriving trips of 10/3×0.8 vehicles are predicted to occur at the port P2 in the SD time. Whenever a demand is actually generated, the predicted arriving trips are modified by taking the demand ratio above into account. Every time a demand occurs at the port Pi, the predicted arriving trip is reported to the port P2. At the port P2, the predicted arriving trip is added to the prediction data when the number of vehicles to be redistributed is determined. Predicted arriving trips are reported between ports.

Figure 20:
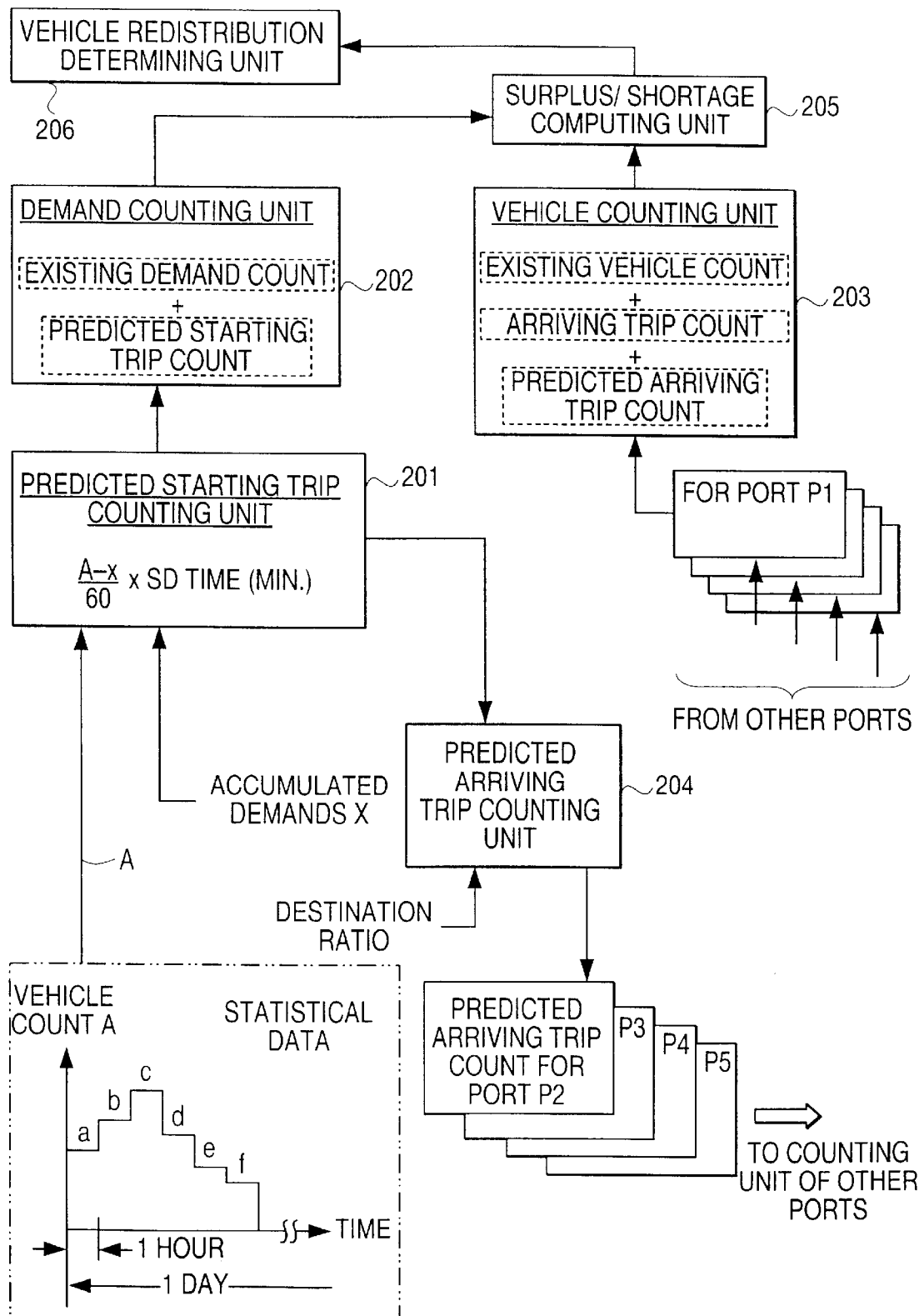
FIG. 20 is a block diagram showing key functions for redistributing vehicles based on the probability of demand occurrence and on destination ratios.

FIG. 20 is a block diagram showing key functions of the terminal 2 at the port PI for redistributing vehicles based on the probability of starting trip (demand) occurrence and on the predicted arriving trips. A predicted starting trip counting unit 201 (i.e., ride demand predicting means) computes the number of predicted starting trips in the SD time based on the predicted starting trips "A" per unit time and on the accumulated demands "x" having actually occurred per unit time. The formula for the computation is shown in FIG. 20. The predicted starting trips "A" may be determined according to the statistical data about past ride demands. The computation is carried out at the beginning of each unit time and every time a demand has actually occurred.

A demand counting unit 202 (i.e., ride demand count detecting means) adds up the predicted starting trip count and the number of currently generated demands to compute the number of demands at the port PI in the SD time. A vehicle counting unit 203 adds up the existing vehicle count and the number of arriving trips predicted to occur in the SD time, to compute the number of vehicles available in the SD time. The arriving trips are of two types: arriving trips deduced from the starting trips that occurred at other ports before the computation, and predicted arriving trips reported from other ports.

A predicted arriving trip counting unit 204 multiplies the number of predicted starting trips computed by the predicted starting trip counting unit 201, by the destination ratio of the predicted starting trips, in order to compute the number of predicted arriving trips to other ports. The predicted arriving trip count thus computed is reported to each of the other ports.

At ports other than the port P1, the number of predicted arriving trips to each port is computed and transmitted. The number of predicted arriving trips to the port P1, received from the other ports, is input to the vehicle counting unit 203 for use in computing the number of vehicles.

A surplus/shortage computing unit 205 computes the difference between the demand count and the vehicle count to detect a surplus or a shortage of vehicles. A vehicle redistribution determining unit 206 determines the number of actually redistributed vehicles by taking into account the surplus or shortage of vehicles at the other ports. As described earlier with reference to FIG. 1, the surplus/shortage computing unit 205 and vehicle redistribution determining unit 206 should preferably be furnished as functions of the host 1.

The above-described embodiment redistributes vehicles more efficiently than before by regarding statistical data as probabilities of demand occurrence in the SD time, and not by predicting the trip count in the SD time based on raw statistical data. Furthermore, the computed probability is reduced progressively in keeping with the actually generated trips, which ensures that vehicles are redistributed more efficiently than ever.

The number of vehicles made available in the SD time can also be predicted accurately in accordance with the predicted arriving trips computed on the basis of which of the ports applicable to predicted starting trips probably serves as the destination. Illustratively, the measures above make it possible to predict the arriving trips Ta41 and Ta52 in FIG. 4.

Although the above-described embodiments have been shown envisaging a system in which the vehicles 4 are run automatically for redistribution, this is not limitative of the invention. Alternatively, vehicles 4 may be redistributed by human drivers or may be towed by tractor or some other appropriate vehicle for the purpose. The invention applies not only to the system of distributing vehicles that are driven by users but also to a distribution system for taxis and limousines.

As described, this invention provides a vehicle distribution system capable of redistributing vehicles based on predicted ride demand data during a vehicle distribution process. If actual ride demands deviate from the predicted ride demand data, the system offers a high degree of leeway in redistributing vehicles and thereby minimizes fluctuations of vehicle waiting times at each of the ports configured in the area.

As described, the vehicle distribution system according to the invention predicts vehicle ride demands and the number of vehicles in a predetermined range of search. Unlike the conventional system that leaves to human judgments the extent to which the predicted ride demands are to be taken into consideration for vehicle distribution, the inventive system ensures stable distribution of vehicles by eliminating arbitrary instructions for vehicle distribution.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method of operating a vehicle allocation system for allocating a first number of vehicles amongst a second number of vehicle ports where passengers demand the services of one or more vehicles, said method comprising the steps of:

acquiring past vehicle demand data based upon past passenger transportation activity;

forming predictive vehicle demand data, based upon the past vehicle demand data;

storing the predictive vehicle demand data;

detecting a number of available vehicles at each of the ports;

sensing current vehicle demand data representing passengers actually seeking transportation at each of the ports;

reading vehicle destination and arrival data of vehicles starting or in transit to one of the ports;

predicting the number of arriving vehicles at each of the ports based upon the vehicle destination and arrival data;

determining whether a given port has a deficiency or an excess of vehicles by analyzing the current vehicle demand data, the predictive vehicle demand data, the number of available vehicles, and the number of arriving vehicles, for a predetermined period of time; and reallocating vehicles from a port determined to have an excess of vehicles to a port determined to have a deficiency of vehicles.

2. The method according to claim 1, further including the step of:
   setting the predetermined period of time to be more than a minimum travel time required for moving a vehicle between ports during said reallocating step.

3. The method according to claim 1, wherein a plurality of predetermined times are available and one of the predetermined times is selected based upon a number of all vehicles deployed and a number of vehicles to be distributed, so that a predetermined number of vehicles to be reallocated will not be exceeded.

4. The method according to claim 1, wherein a plurality of predetermined times are available and one of the predetermined times is selected based upon a number of all vehicles deployed and an average waiting time of passengers, so that a predetermined maximum waiting time for passengers will not be exceeded.

5. The method according to claim 1, wherein said predetermined time varies over a course of a day.

6. The method according to claim 1, wherein said predetermined time varies dependent upon a day of the week.

7. The method according to claim 1, wherein said predetermined time varies in response to weather conditions.

8. The method according to claim 5, wherein said predetermined time is shortened if the predictive vehicle demand data exceeds a predetermined level during the course of the day.

9. The method according to claim 1, wherein the product of the number of vehicles reallocated in said reallocating step and an average waiting time for passengers is obtained by simulation with the predetermined time used as a parameter, and selecting a predetermined time such that the product is minimized.

10. The method according to claim 1, wherein if a total number of vehicles deployed is less than a predetermined count, the predetermined time is set approximately equal to a maximum time required to reallocate vehicles between ports.

11. The method according to claim 1, wherein if a number of parking spaces at a given port is approximately equal to or less than a sum of the available vehicles at the given port and a predicted number of arriving vehicles at the given port, a vehicle or vehicles at the given port are reallocated from the given port during said reallocating step regardless of whether an excess of vehicles at the given port is determined.

12. The method according to claim 11, wherein the vehicle or vehicles are reallocated to a port having the least available vehicles.

13. A vehicle distribution system for distributing vehicles among a plurality of ports within an area in response to ride demands generated at each of said ports, said vehicle distribution system comprising:
   predicted ride demand data storing means for storing predicted ride demand data established on the basis of statistical ride demand data regarding all ports;
   vehicle count detecting means for detecting an existing vehicle count at each of said ports;
   demand detecting means for detecting ride demand information including a current ride demand count and destination information regarding each of said ports;
   arriving vehicle predicting means for predicting arrivals of vehicles at each port from other ports as a predicted arriving vehicle count based on said destination information;
   surplus and shortage computing means for computing either a surplus or a shortage of vehicles at each of said ports by comparing, within a range of search represented by a predetermined period of time at each port, said current ride demand count and said predicted ride demand data, with said existing vehicle count and said predicted arriving vehicle count; and
   vehicle redistributing means for redistributing vehicles from a port having surplus vehicles to a port lacking vehicles on the basis of results of the computation indicating either said surplus or said shortage of vehicles.

14. The vehicle distribution system according to claim 13, wherein said range of search represented by said predetermined period of time is set approximately equal to, or greater than, a minimum travel time required to move vehicles between ports for redistribution.

15. The vehicle distribution system according to claim 13, wherein said range of search represented by said predetermined period of time varies in the course of a day.

16. The vehicle distribution system according to claim 15, wherein said range of search represented by said predetermined period of time is shortened if said predicted ride demand data exceeds a predetermined level during the day.

* * * * *